(12) United States Patent
Kulkarni et al.

(10) Patent No.: US 12,373,755 B2
(45) Date of Patent: Jul. 29, 2025

(54) GENERATING A MITIGATION WORKFLOW FOR MITIGATING A TECHNICAL ISSUE OF A COMPUTING SERVICE USING HISTORICAL MITIGATION WORKFLOWS

(71) Applicant: Microsoft Technology Licensing, LLC, Redmond, WA (US)

(72) Inventors: Hrishikesh Devadatta Kulkarni, Seattle, WA (US); Navendu Jain, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 517 days.

(21) Appl. No.: 17/567,106

(22) Filed: Dec. 31, 2021

(65) Prior Publication Data

US 2023/0214750 A1    Jul. 6, 2023

(51) Int. Cl.
G06Q 10/0635    (2023.01)
G06Q 10/0633    (2023.01)

(52) U.S. Cl.
CPC ..... *G06Q 10/0633* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 6,606,744 B1 * | 8/2003 | Mikurak | H04L 9/40 717/174 |
| 9,286,567 B1 | 3/2016 | Martinez et al. | |
| 10,503,478 B2 | 12/2019 | Maurya et al. | |
| 11,526,751 B2 | 12/2022 | Singh | |
| 11,755,402 B1 | 9/2023 | Chavan | |
| 2009/0254572 A1 | 10/2009 | Redlich et al. | |
| 2010/0131450 A1 | 5/2010 | Nguyen et al. | |
| 2013/0007527 A1 | 1/2013 | Petukhov | |
| 2018/0120109 A1 * | 5/2018 | Fite-Georgel | G05D 1/0274 |

(Continued)

FOREIGN PATENT DOCUMENTS

| | | | |
|---|---|---|---|
| WO | 2019216975 A1 | 11/2019 | |
| WO | WO-2023154704 A1 * | 8/2023 | G06N 20/00 |

OTHER PUBLICATIONS

Kaikai An et al, "Nissist: An Incident Mitigation Copilot Based on Troubleshooting Guides," 2024, Peking University and Microsoft, pp. 4471-4474 (Year: 2024).*

(Continued)

*Primary Examiner* — Amanda Gurski
(74) *Attorney, Agent, or Firm* — Wade IP Law PLLC

(57) ABSTRACT

Techniques are described herein that are capable of generating a mitigation workflow for a computing service using historical mitigation workflows. A determination is made that a historical technical issue that was encountered by a first computing service corresponds to a current technical issue that is encountered by a second computing service. A workflow, which is configured to mitigate the current technical issue, is generated to include historical mitigation operations that are included in historical mitigation workflows that were performed to mitigate the historical technical issue based at least in part on the historical technical issue corresponding to the current technical issue.

20 Claims, 8 Drawing Sheets

(56) References Cited

U.S. PATENT DOCUMENTS

| | | |
|---|---|---|
| 2018/0307756 A1 | 10/2018 | Garay |
| 2019/0050239 A1 | 2/2019 | Caldwell |
| 2019/0171735 A1 | 6/2019 | Miller |
| 2019/0230003 A1 | 7/2019 | Gao |
| 2019/0266253 A1 | 8/2019 | Maiti |
| 2019/0339684 A1* | 11/2019 | Cella .................... G05B 23/024 |
| 2020/0118195 A1 | 4/2020 | Li |
| 2020/0184428 A1 | 6/2020 | Kurian |
| 2020/0293946 A1 | 9/2020 | Sachan et al. |
| 2021/0158146 A1 | 5/2021 | Singh |
| 2021/0264438 A1 | 8/2021 | Singh |
| 2021/0374563 A1 | 12/2021 | Jezewski |
| 2022/0101148 A1 | 3/2022 | Lin |
| 2022/0109615 A1 | 4/2022 | Roy |
| 2022/0198259 A1 | 6/2022 | Dutt |
| 2022/0291990 A1 | 9/2022 | Iyer |
| 2022/0414463 A1 | 12/2022 | Mittal et al. |
| 2023/0047346 A1 | 2/2023 | Daniel |
| 2023/0132033 A1 | 4/2023 | Gupta et al. |
| 2023/0164056 A1 | 5/2023 | Nguyen |

OTHER PUBLICATIONS

"International Search Report and Written Opinion Issued in PCT Application No. PCT/US22/038418", Mailed Date: Dec. 16, 2022, 18 Pages.

"International Search Report and Written Opinion Issued in PCT Application No. PCT/US22/044470", Mailed Date: Dec. 16, 2022, 22 Pages.

"Application as Filed in U.S. Appl. No. 17/508,920", filed Oct. 22, 2021, 83 Pages.

"Application as Filed in U.S. Appl. No. 17/446,153", filed Aug. 26, 2021, 59 Pages.

"Jupyter", Retrieved from: https://jupyter.org/, Retrieved on: Sep. 14, 2022, 10 Pages.

Bhog, et al., "Create A Parameterized Notebook by using Papermill", Retrieved from: https://web.archive.org/web/20211203172217/https://docs.microsoft.com/en-us/sql/azure-data-studio/notebooks/parameterize-papermill?view=sql-server-ver15, Jul. 27, 2021, 8 Pages.

Ghanayem, et al., "Use Jupyter Notebooks in Azure Data Studio", Retrieved from: https://web.archive.org/web/20210412190231/https://docs.microsoft.com/en-us/sql/azure-data-studio/notebooks/notebooks-guidance?view=sql-server-ver15, Jul. 1, 2020, 5 Pages.

"Invitation to Pay Additional Fee Issued in PCT Application No. PCT/US22/038418", Mailed Date: Oct. 25, 2022, 10 Pages.

Non-Final Office Action mailed on Jun. 5, 2024, in U.S. Appl. No. 17/508,920, 47 pages.

Final Office Action mailed on Feb. 13, 2025, in U.S. Appl. No. 17/508,920, 71 pages.

\* cited by examiner

GENERATING A MITIGATION WORKFLOW FOR MITIGATING A TECHNICAL ISSUE OF A COMPUTING SERVICE USING HISTORICAL MITIGATION WORKFLOWS

BACKGROUND

Computing services sometimes encounter technical issues, which may negatively impact security or performance of the computing services or increase a likelihood of such a negative impact. Incident management may be performed to identify, analyze, and mitigate the technical issues, for example, to ensure high availability of the computing services. Incident management traditionally falls into two broad categories: human-driven mitigation and hybrid mitigation.

In human-driven mitigation, an on-call engineer performs all tasks required to mitigate an incident (e.g., a technical issue) that is encountered by a computing service. For instance, the on-call engineer may manually analyze information to understand the technical issue, determine which mitigation actions are to be performed, and execute those actions. Users of the computing service typically remain impacted until the on-call engineer completes the mitigation. Limited tooling, lack of domain knowledge, and other issues often compromise the speed and effectiveness with which the on-call engineer can perform the tasks to mitigate the incident.

In hybrid mitigation, an on-call engineer performs some of the tasks required to mitigate the incident, and pre-configured workflows perform the remaining tasks. Manual creation and maintenance of the pre-configured workflows requires substantial effort. Moreover, as the computing service evolves and grows in complexity, maintaining the pre-configured workflows to be kept consistent and coordinating the pre-configured workflows across an entirety of the computing service and its dependencies may become challenging.

SUMMARY

Various approaches are described herein for, among other things, generating (e.g., automatically generating) a mitigation workflow for a computing service using historical mitigation workflows. A mitigation workflow includes one or more mitigation operations that are configured to contribute to mitigation of a technical issue encountered by a computing service. The mitigation operations may be configured in a designated order. For instance, the mitigation operations may provide a step-by-step resolution of the technical issue. A computing service is configured to provide computing resources to a user of the computing service. The computing service may be a cloud computing service, an on-premises computing service, or a hybrid computing service (partially cloud-based and partially on-premises-based). The computing service may be configured in accordance with any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

In a first example approach, a determination is made that a historical technical issue that was encountered by a first computing service is related to a current technical issue that is encountered by a second computing service based at least in part on a confidence factor associated with the historical technical issue being greater than or equal to a confidence threshold. The confidence factor represents a confidence that a first attribute of the historical technical issue corresponds to a second attribute of the current technical issue. Historical mitigation workflows that were performed to mitigate the historical technical issue are identified. Each historical mitigation workflow includes a historical mitigation operation. A relevance of each historical mitigation operation in the historical mitigation workflows is determined. A mitigation workflow, which is configured to mitigate the current technical issue, is generated by selecting the historical mitigation operations based at least in part on each historical mitigation operation having a relevance that satisfies a relevance criterion.

In a second example approach, a historical mitigation operation that was performed to address a historical technical issue that was encountered by a first computing service is identified. A current technical issue that is encountered by a second computing service is mapped to the historical technical issue, based at least in part on a first attribute of the current technical issue corresponding to a second attribute of the historical technical issue. A mitigation workflow, which is configured to mitigate the current technical issue, is generated to include the historical mitigation operation that was performed to address the historical technical issue based at least in part on the current technical issue being mapped to the historical technical issue.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
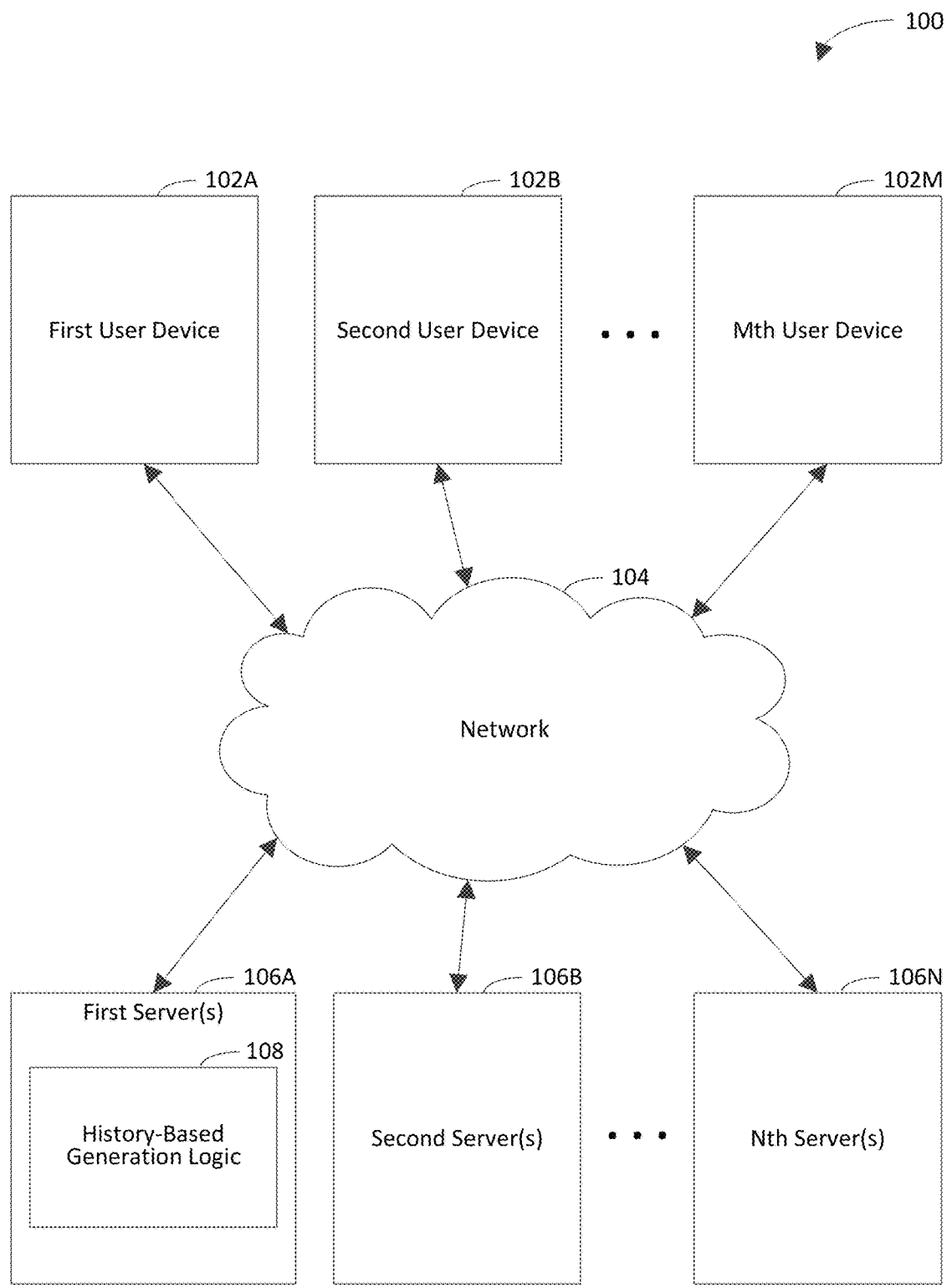
FIG. 1 is a block diagram of an example history-based auto-generation workflow system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

Example embodiments described herein are capable of generating (e.g., automatically generating) a mitigation workflow for a computing service using historical mitigation workflows. For instance, the mitigation workflow may be generated for mitigating a current technical issue mitigation operation based on the current technical issue corresponding to historical technical issue(s) that the historical mitigation workflows were configured to mitigate and using mitigation operations in the historical mitigation workflows. A technical issue is an issue that negative affects performance of a computing service or that is capable of negatively affecting performance of the computing service under designated conditions. A mitigation workflow is a workflow that is configured to, when executed, contribute to mitigation of a technical issue that is encountered by a computing service. Mitigation of a technical issue means addressing the technical issue. For instance, the technical issue may be addressed by identifying (e.g., diagnosing) the technical issue, analyzing the technical issue, reducing a risk of encountering the technical issue, and/or reducing a severity of the technical issue. For example, the severity of the technical issue may be reduced by providing a work-around that avoids a negative consequence of the technical issue and/or reduces an extent to which a negative consequences occurs. In another example, the severity may be reduced by resolving an aspect (e.g., an entirety) of the technical issue. Examples of mitigation of a technical issue include debugging a computing service that encounters the technical issue, analyzing the computing service, analyzing information (e.g., logs) used by the computing service, analyzing information produced by the computing service, troubleshooting the computing service, and testing the computing service. For instance, mitigation may include reviewing query logs and/or performing tests (e.g., checks) on the computing service to determine which mitigation operations are to be applied for the current technical issue.

Each mitigation workflow includes one or more mitigation operations. A mitigation operation is an operation that contributes to mitigation of a technical issue. Examples of a mitigation operation include execution of a PowerShell script, execution of a query (e.g., a domain name server (DNS) lookup or a diagnostic query such as an Azure Data Explorer query), execution of a command (e.g., a command line interface command) to change a state of a device or system), execution of an application programming interface (API) request, retrieval of a stack trace, and access of a uniform resource identifier (URI). An Azure Data Explorer query (e.g., a Kusto query) is a query that is implemented using a Microsoft® Azure® Data Explorer query language. The Azure Data Explorer query may be used to obtain a table or a tabular dataset that includes information related to a technical issue. For instance, the information may indicate a time at which the technical issue began, a time at which the technical issue ended, a number of users who were negatively affected by the technical issue, and so on. Examples of a URI include a uniform resource name (URN) and a uniform resource label (URL).

A historical mitigation workflow is a mitigation workflow that was generated in the past. Mitigation operations that are included in a historical mitigation workflow are referred to as historical mitigation operations. The mitigation operations in a mitigation workflow may be configured in a designated order. For instance, the mitigation operations may provide a step-by-step resolution of the technical issue.

A computing service is a service that is configured to provide computing resources to a user of a computing service. The computing service may be a cloud computing service, an on-premises computing service, or a hybrid computing service (partially cloud-based and partially on-premises-based). Examples of a cloud computing service include the Google Cloud® service developed and distributed by Google Inc., the Oracle Cloud® service developed and distributed by Oracle Corporation, the Amazon Web Services® service developed and distributed by Amazon.com, Inc., the Salesforce® service developed and distributed by Salesforce.com, Inc., the AppSource® service developed and distributed by Microsoft Corporation, the Azure® service developed and distributed by Microsoft Corporation, the GoDaddy® service developed and distributed by GoDaddy.com LLC, and the Rackspace® service developed and distributed by Rackspace US, Inc. The computing service may be configured in accordance with any of a variety of service models, including Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Example techniques described herein have a variety of benefits as compared to conventional techniques for generating mitigation workflows for computing services. For instance, the example techniques are capable of reducing a number of manual operations that are performed by a user (e.g., an engineer, such as an on-call engineer) to generate and/or execute a mitigation workflow. The example techniques may eliminate a need for such manual operations. Accordingly, the example techniques obviate a need for the user to manually create, execute, and/or maintain the workflow. The user may be engaged as desired for feedback or further resolution. The example techniques may reduce (e.g., minimize) an amount of human knowledge and effort needed to create, execute, and/or maintain the workflow, which may improve a health of the computing service (e.g., by reducing downtime of the computing service, by increasing reliability of the computing service) and a work-life balance of the user.

By reducing the number of manual operations that are performed by the user, the example techniques increase productivity of the user, improve the health of the computing service, and reduce a cost associated with creating, executing, and/or maintaining the mitigation workflow. For example, the cost associated with manual operations that are rendered unnecessary by the example techniques may be eliminated. By partially or entirely automating generation of the mitigation workflow, the example techniques may improve (e.g., increase) a user experience of the user and/or increase efficiency of the user.

By partially or entirely automating generation of a workflow to mitigate a technical issue, the example techniques may mitigate (e.g., resolve) the technical issue more quickly, thoroughly, reliably, and/or effectively than conventional workflow generation techniques. For instance, manual generation of a mitigation workflow may result in omissions of mitigation operations, errors in mitigation operations, the mitigation workflow falling out of date, and so on. Automatically generating the mitigation workflow (or at least some aspects thereof) may reduce a likelihood of (e.g., eliminate) such omissions, errors, and/or falling out of date (e.g., thereby increasing the quality of the mitigation workflow). By mitigating the technical issue more quickly, the example techniques reduce an extent of negative effects that result from the technical issue.

By partially or entirely automating generation of a mitigation workflow, the example techniques also reduce a likelihood that mitigation operations in the mitigation workflow will damage the computing service (e.g., compromise security or functionality of the computing service). Accordingly, the example techniques may increase security of a computing system that executes the computing service. By partially or entirely automating generation of the mitigation workflow, scalability and/or consistency of the example techniques may be increased. The example techniques may also reduce a likelihood of the technical issue recurring in the future.

Further, the example techniques may reduce an amount of time and/or resources (e.g., processor cycles, memory, network bandwidth) that is consumed to generate a mitigation workflow. For instance, by partially or entirely automating generation of the mitigation workflow, a computing system may reduce the time and resources that would have been consumed by the computing system to execute instructions initiated by the user to figure out which mitigation operations are to be included in the mitigation workflow, to execute unnecessary or undesirable operations, and/or to execute instructions to remedy the effects of undesirable operations being performed as a result of errors or omissions in the mitigation workflow.

FIG. 1 is a block diagram of an example history-based auto-generation workflow system 100 in accordance with an embodiment. Generally speaking, the history-based auto-generation workflow system 100 operates to provide information to users (e.g., engineers) in response to requests (e.g., hypertext transfer protocol (HTTP) requests) that are received from the users. In various embodiments, the information includes documents (e.g., Web pages, images, audio files, and video files), output of executables, and/or any other suitable type of information. In accordance with example embodiments described herein, the history-based auto-generation workflow system 100 generates a mitigation workflow for a computing service using historical mitigation workflows. Detail regarding techniques for generating a mitigation workflow for a computing service using historical mitigation workflows is provided in the following discussion.

As shown in FIG. 1, the history-based auto-generation workflow system 100 includes a plurality of user devices 102A-102M, a network 104, and a plurality of servers 106A-106N. Communication among the user devices 102A-102M and the servers 106A-106N is carried out over the network 104 using well-known network communication protocols. In embodiments, the network 104 is a wide-area network (e.g., the Internet), a local area network (LAN), another type of network, or a combination thereof.

The user devices 102A-102M are processing systems that are capable of communicating with servers 106A-106N. A processing system is a system that includes at least one processor that is capable of manipulating data in accordance with a set of instructions. For instance, a processing system may be a computer or a personal digital assistant. The user devices 102A-102M are configured to provide requests to the servers 106A-106N for information stored on (or otherwise accessible via) the servers 106A-106N. For instance, in embodiments, a user initiates a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 106A-106N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (e.g., Web pages, images, audio files, and video files), output of executables, or any other suitable type of information. In accordance with some example embodiments, the servers 106A-106N are configured to host respective Web sites, so that the Web sites are accessible to users of the history-based auto-generation workflow system 100.

One example type of computer program that may be executed by one or more of the servers 106A-106N is a computing service. The computing service may be a cloud computing service, an on-premises computing service, or a hybrid computing service (partially cloud-based and partially on-premises-based). It will be recognized that the example techniques described herein may be implemented using a cloud computing service. For instance, a software product (e.g., a subscription service, a non-subscription service, or a combination thereof) may include the cloud computing service, and the software product may be configured to perform the example techniques, though the scope of the example embodiments is not limited in this respect.

The first server(s) 106A are shown to include history-based generation logic 108 for illustrative purposes. The history-based generation logic 108 is configured to generate a mitigation workflow for a computing service using historical mitigation workflows. In a first example approach, the history-based generation logic 108 determines that a historical technical issue that was encountered by a first computing service is related to a current technical issue that is encountered by a second computing service based at least in part on a confidence factor associated with the historical technical issue being greater than or equal to a confidence threshold. The confidence factor represents a confidence that a first attribute of the historical technical issue corresponds to a second attribute of the current technical issue. Examples of an attribute of a technical issue (e.g., a historical technical issue or a current technical issue) include a title of the technical issue (e.g., keywords in the title), a type of the technical issue, a spatial attribute, and a temporal attribute. Example types of technical issues include a connectivity issue (e.g., a failure to connect with the computing service via a network), a hardware issue (e.g., a hardware component on a computing system that hosts or runs the computing service failing or performing at a level that is less than a performance threshold), a temperature issue (e.g., a temperature of a computing system that hosts or runs the computing service (or a hardware component therein) having a temperature that is greater than or equal to a temperature threshold), and a service interruption (e.g., the computing service fails to respond to requests and/or commands). Examples of a spatial attribute include a monitor source (e.g., a daemon or process) that collects a metric associated with the computing service, a device (e.g., a device name) that utilized the computing service, a data center that executes the computing service or that is negatively affected by a technical issue encountered by the computing service, a geographical region in which the computing service executes or that is negatively affected by a technical issue that is encountered by the computing service, and a component of the computing service. Examples of a temporal attribute include a date on or date range over which a technical issue that is encountered by the computing service occurs, a time at or time range over which a technical issue that is encountered by the computing service occurs, and a causal relationship between a first event and a second event. The causal relationship indicates that occurrence of the first event causes occurrence of the second event. For example, the first event may include a second service that is different from the computing service receiving an update, and the second event may include the computing service failing to respond to some queries that it receives.

The history-based generation logic 108 identifies historical mitigation workflows that were performed to mitigate the historical technical issue. Each historical mitigation workflow includes a historical mitigation operation. The history-based generation logic 108 determines a relevance of each historical mitigation operation in the historical mitigation workflows. The history-based generation logic 108 generates a mitigation workflow, which is configured to mitigate the current technical issue, by selecting the historical mitigation operations based at least in part on each historical mitigation operation having a relevance that satisfies a relevance criterion.

In a second example approach, the history-based generation logic 108 identifies a historical mitigation operation that was performed to address a historical technical issue that was encountered by a first computing service. The history-based generation logic 108 maps a current technical issue that is encountered by a second computing service to the historical technical issue, based at least in part on a first attribute of the current technical issue corresponding to a second attribute of the identified technical issue. The history-based generation logic 108 generates a mitigation workflow, which is configured to mitigate the current technical issue, to include the historical mitigation operation that was performed to address the historical technical issue based at least in part on the current technical issue being mapped to the historical technical issue.

The history-based generation logic 108 may use machine learning (ML) to perform at least some of its analysis. For instance, the history-based generation logic 108 may use the ML to analyze (e.g., develop and/or refine an understanding of) historical and current information (e.g., system-generated information, computing service-generated information, user-generated information) to identify the historical technical issue(s) that have been previously encountered by computing service(s) (including attributes of the historical technical issue(s)), the historical mitigation workflow(s) that have been previously performed to mitigate the respective historical technical issue(s), the historical mitigation operations that are included in the historical mitigation work flow(s), the current technical issue that is encountered by the computing service (including attributes of the current technical issue), relationships among any of the aforementioned factors, and confidences in those relationships.

For example, the history-based generation logic 108 may use the ML to analyze the historical and current information to identify historical technical issue(s) that were encountered by computing service(s), identify attributes of the historical technical issue(s), identify attributes of a current technical issue that is encountered by the computing service, determine correlations between attributes of at least some of the historical technical issue(s) and at least some attributes of the current technical issue, determine confidences in the correlations, identify historical mitigation workflows that were performed to mitigate the respective historical technical issue(s), identify historical mitigation operation(s) that are included in each historical mitigation workflow, and/or generate a mitigation workflow for mitigating the current technical issue by aggregating at least some of the historical mitigation operation(s) based at least in part on a relevance of each historical mitigation operation.

In another example, the history-based generation logic 108 uses the ML to analyze the historical and current information to identify historical mitigation operation(s) that were performed to mitigate historical technical issue(s) that were encountered by computing service(s), identify attributes of the historical technical issue(s), identify attributes of a current technical issue that is encountered by the computing service, determine correlations between attributes of at least some of the historical technical issue(s) and at least some attributes of the current technical issue, determine confidences in the correlations, map the current technical issue to at least a subset of the historical technical issue(s) based on the correlations, and/or generate a mitigation workflow for mitigating the current technical issue such that the mitigation workflow includes at least some (e.g., all or fewer than all) of the historical mitigation operation(s) that were performed to mitigate the historical technical issue(s) in at least the subset.

In some embodiments, the history-based generation logic 108 uses a neural network to perform the ML to determine historical and current technical issue(s) (including attributes of those technical issues), relationships between the attri butes, confidences in the relationships, mitigation workflow(s) associated with the historical technical issue(s), mitigation operations in the mitigation workflow(s), and/or confidences in the associations between the mitigation workflow(s) (and the mitigation operations therein) and the historical technical issues. The history-based generation logic 108 may use such determinations (e.g., predictions) to generate a mitigation workflow for the current technical issue. For example, the attributes of the historical and current technical issues may be analyzed to determine similarities between the attributes, logs and user-generated information (e.g., user-generated documentation) may be analyzed to determine the mitigation operations associated with each historical technical issue, and the historical mitigation operations that are to be included in the workflow for mitigating the current technical issue may be determined based on the similarities between the current technical issue and the historical technical issue(s) with which those historical mitigation operations are associated. User-generated information is information that is generated by a user of a computing service. For instance, the user may be an engineer (e.g., on-call engineer) who manages the computing service (e.g., manages mitigation of technical issues encountered by the computing service), a developer of the computing service, or an end-user of the computing service.

Examples of a neural network include a feed forward neural network and a long short-term memory (LSTM) neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the history-based generation logic 108 employs a feed forward neural network to train a ML model that is used to determine ML-based confidences. Such ML-based confidences may be used to determine likelihoods that events will occur.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In one example, the LSTM neural network is capable of storing information, such as historical technical issues (including attributes thereof), historical mitigation workflows associated with those historical technical issues, and/or historical mitigation operations in the historical mitigation workflows over time. For instance, the LSTM neural network may generate a historical technical issue model, a historical mitigation workflow model, and/or a historical mitigation operation model by utilizing such information. In another example, the LSTM neural network is capable of remembering relationships (e.g., relationships between historical technical issues, historical mitigation workflows, and/or historical mitigation operations) and ML-based confidences that are derived therefrom.

In embodiments, the history-based generation logic 108 includes training logic and inference logic. The training logic is configured to train a ML algorithm that the inference logic uses to determine (e.g., infer) the ML-based confidences. For instance, the training logic may provide sample historical technical issues (including sample attributes thereof), sample historical mitigation workflows, sample historical mitigation operations, sample current technical issues (including sample attributes thereof), sample mitigation workflows for mitigating the sample current technical issues, sample probabilities that the attributes of the sample historical technical issues correspond to the attributes of the sample current technical issues, sample probabilities that the sample historical mitigation workflows are associated with the sample historical technical issues, and sample confidences as inputs to the algorithm to train the algorithm. The sample data may be labeled. The ML algorithm may be configured to derive relationships between attributes of the historical technical issues and attributes of a current technical issue, between the historical technical issues and the historical mitigation workflows (and historical mitigation operations therein), and between any of the foregoing factors and the resulting ML-based confidences. The inference logic is configured to utilize the ML algorithm, which is trained by the training logic, to determine the ML-based confidence when the historical and current information is provided as input to the algorithm.

In various embodiments, the history-based generation logic 108 may be implemented in various ways to generate a mitigation workflow for a computing service using historical mitigation workflows, including being implemented in hardware, software, firmware, or any combination thereof. For example, the history-based generation logic 108 may be implemented as computer program code configured to be executed in a processing system (e.g., one or more processors). In another example, at least a portion of the history-based generation logic 108 is implemented as hardware logic/electrical circuitry. For instance, at least a portion of the history-based generation logic 108 may be implemented in a field-programmable gate array (FPGA), an application-specific integrated circuit (ASIC), an application-specific standard product (ASSP), a system-on-a-chip system (SoC), or a complex programmable logic device (CPLD). Each SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

The history-based generation logic 108 may be partially or entirely incorporated into a computing service, though the example embodiments are not limited in this respect.

The history-based generation logic 108 is shown to be incorporated in the first server(s) 106A for illustrative purposes and is not intended to be limiting. It will be recognized that the history-based generation logic 108 (or any portion(s) thereof) may be incorporated in any one or more of the user devices 102A-102M. For example, client-side aspects of the history-based generation logic 108 may be incorporated in one or more of the user devices 102A-102M, and server-side aspects of history-based generation logic 108 may be incorporated in the first server(s) 106A. In another example, the history-based generation logic 108 is distributed among the user devices 102A-102M. In yet another example, the history-based generation logic 108 is incorporated in a single one of the user devices 102A-102M. In another example, the history-based generation logic 108 is distributed among the server(s) 106A-106N. In still another example, the history-based generation logic 108 is incorporated in a single one of the servers 106A-106N.

Figure 2:
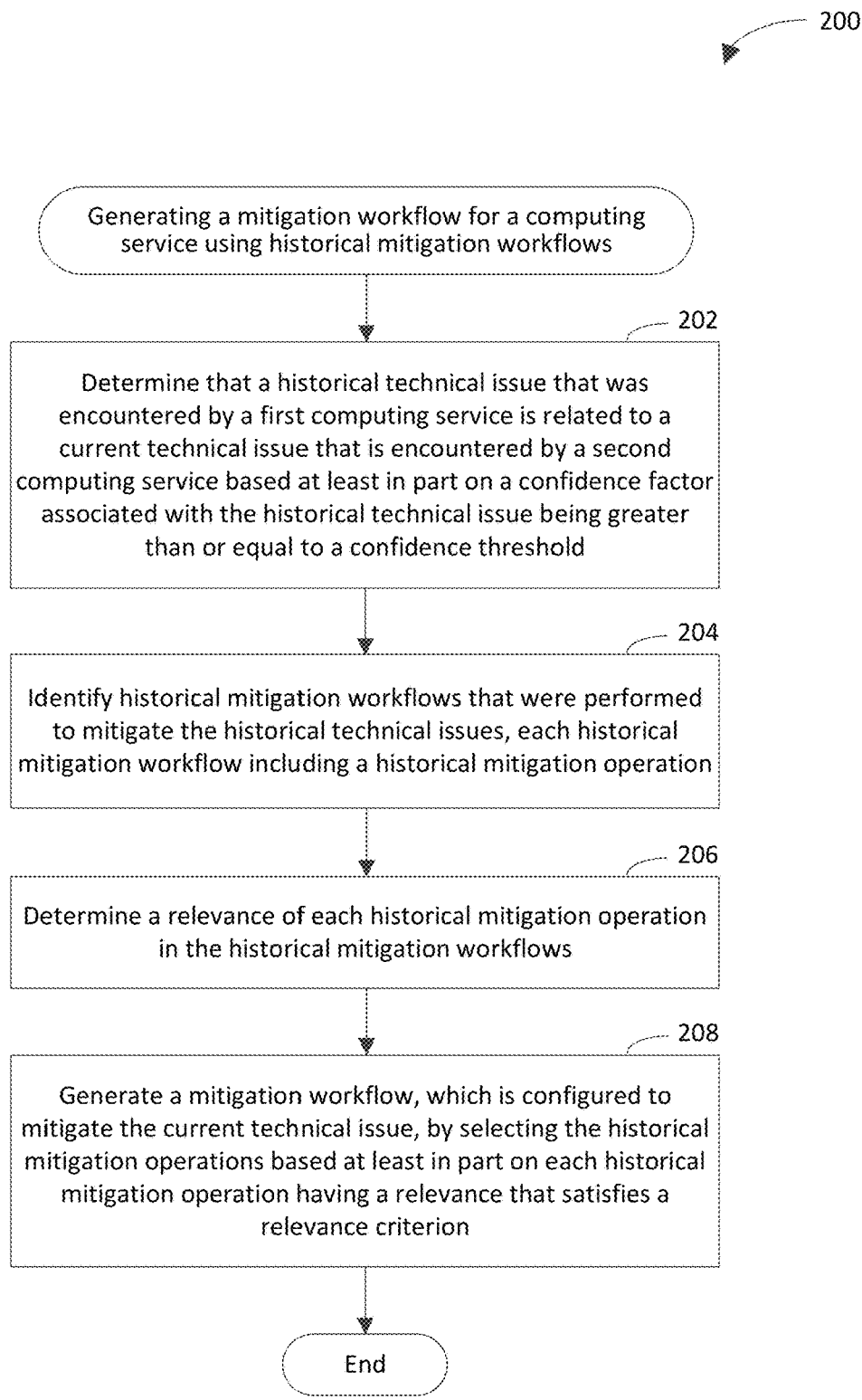
FIGS. 2-3 and 5-6 depict flowcharts of example methods for generating a mitigation workflow for a computing service using historical mitigation workflows in accordance with embodiments.
Figure 3:
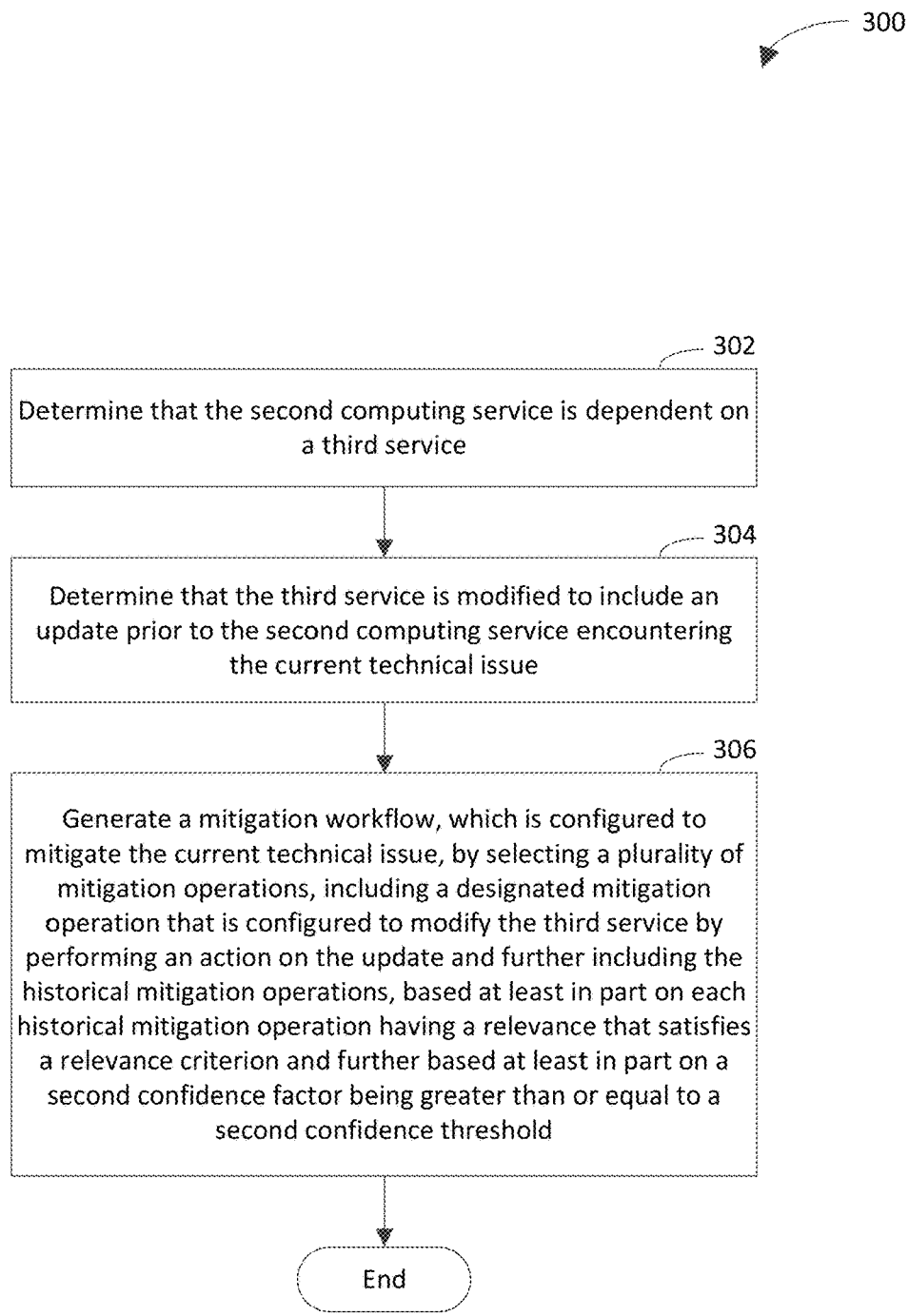
Figure 4:
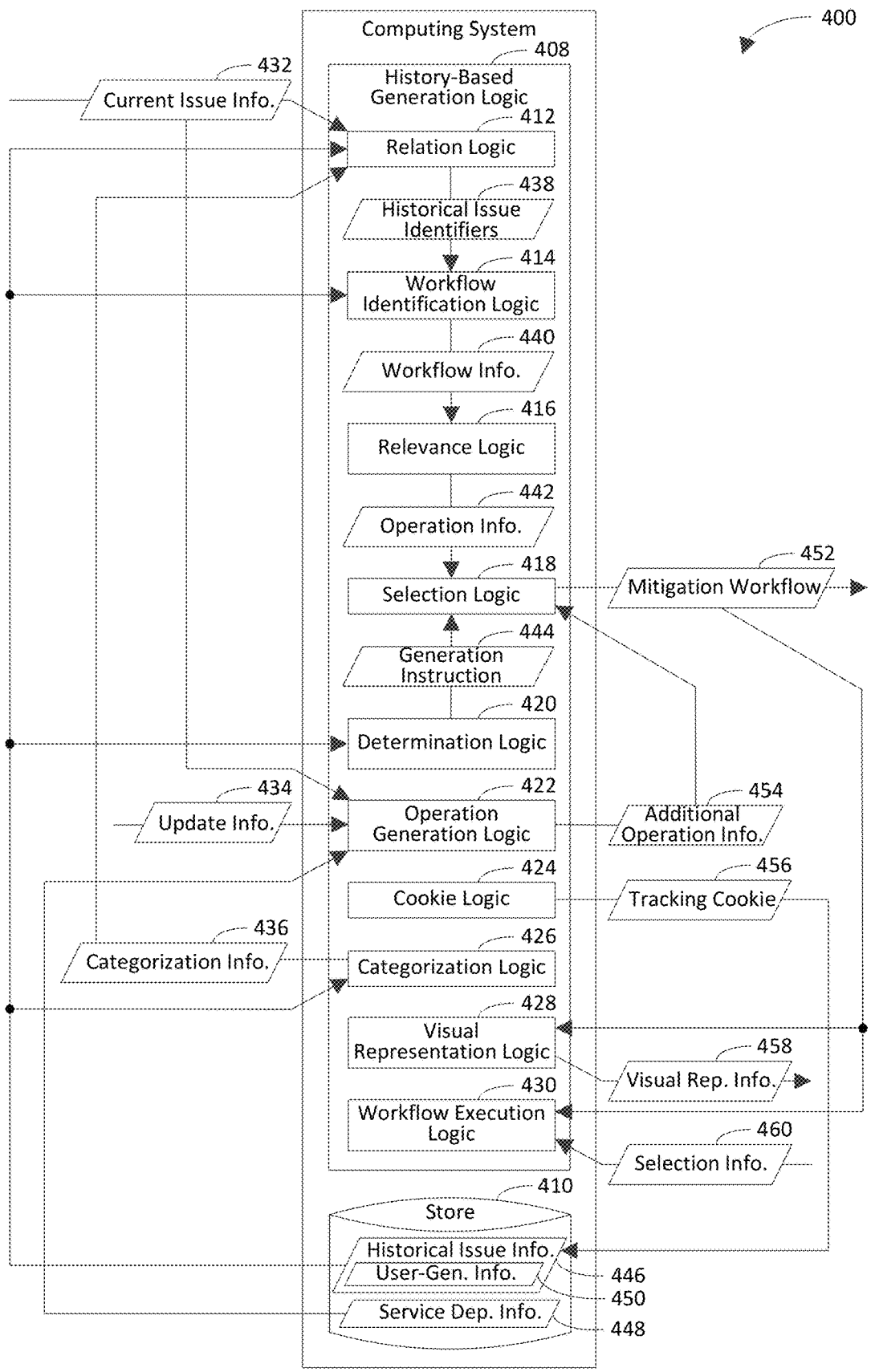
FIGS. 4 and 7 are block diagrams of example computing systems in accordance with embodiments.

FIGS. 2-3 depict flowcharts 200 and 300 of example methods for generating a mitigation workflow for a computing service using historical mitigation workflows in accordance with embodiments. Flowcharts 200 and 300 may be performed by the first server(s) 106A, shown in FIG. 1, for example. For illustrative purposes, flowcharts 200 and 300 are described with respect to computing system 400 shown in FIG. 4, which is an example implementation of the first server(s) 106A. As shown in FIG. 4, the computing system 400 includes history-based generation logic 408 and a store 410. The history-based generation logic 408 includes relation logic 412, workflow identification logic 414, relevance logic 416, selection logic 418, determination logic 420, operation generation logic 422, cookie logic 424, categorization logic 426, visual representation logic 428, and workflow execution logic 430. The store 410 may be any suitable type of store. One suitable type of store is a database. For instance, the store 410 may be a relational database, an entity-relationship database, an object database, an object relational database, or an extensible markup language (XML) database. The store 410 is shown to store historical issue information 446 and service dependency information 448 for illustrative purposes. The historical issue information 446 is shown to include user-generated information 450 for illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, a determination is made that a historical technical issue that was encountered by a first computing services is related to a current technical issue that is encountered by a second computing service based at least in part on a confidence factor associated with the historical technical issue being greater than or equal to a confidence threshold. Each computing service may be a cloud-based service, an on-premises enterprise service, or a hybrid enterprise service. A hybrid enterprise service is a computing service that is partially implemented in the cloud and partially implemented on premises in an enterprise. The confidence factor represents a confidence that a first attribute of the historical technical issue corresponds to (e.g., are same as or cause) a second attribute of the current technical issue. Examples of an attribute of a technical issue (e.g., a historical technical issue or a current technical issue) include a title of the technical issue (e.g., keywords in the title), a type of the technical issue, a spatial attribute, and a temporal attribute. Example types of technical issues include a connectivity issue, a hardware issue, a temperature issue, and a service interruption (e.g., the computing service fails to respond). Examples of a spatial attribute include a monitor source (e.g., a daemon or process) that collects a metric associated with the computing service, a device (e.g., a device name) that utilized the computing service, a data center that executes the computing service or that is negatively affected by a technical issue encountered by the computing service, a geographical region in which the computing service executes or that is negatively affected by a technical issue that is encountered by the computing service, and a component of the computing service. Examples of a temporal attribute include a date on or date range over which a technical issue that is encountered by the computing service occurs, a time at or time range over which a technical issue that is encountered by the computing service occurs, and a causal relationship between a first event and a second event. The causal relationship indicates that occurrence of the first event causes occurrence of the second event.

In an example implementation, the relation logic 412 determines that the historical technical issue is related to the current technical issue based at least in part on the confidence factor being greater than or equal to the confidence threshold. For instance, the relation logic 412 may retrieve the historical issue information 446 from the store 410. In such embodiments, the historical issue information 446 may indicate each historical technical issue and the attribute(s) of each historical technical issue. Accordingly, the relation logic 412 may identify the historical technical issue(s) and the attribute(s) of each historical technical issue by analyzing the historical issue information 446. In embodiments, current issue information 432 indicates the current technical issue and the attribute(s) of the current technical issue. For instance, the relation logic 412 may obtain the current issue information 432 (e.g., any portion thereof) by monitoring performance of the computing service in real-time and/or by retrieving the current issue information 432 from logs generated by the computing service and/or logs generated by the computing system 400. In some embodiments, the relation logic 412 compares the attribute(s) of each historical technical issue, as indicated by the historical issue information 446, to the attribute(s) of the current technical issue, as indicated by the current issue information 432, to determine the confidence that the attribute(s) of the respective historical technical issue are related to the attribute(s) of the current technical issue. For instance, the relation logic 412 may analyze the attribute(s) of each historical technical issue and the attributes(s) of the current technical issue using a ML technique to determine the respective confidence. The relation logic 412 may establish a confidence factor to represent each confidence and compare each confidence factor to the confidence threshold to determine whether the respective historical technical issue is related to the current technical issue. The relation logic 412 may generate historical issue identifiers 438 to identify the historical technical issue(s) that are related to the current technical issue.

At step 204, historical mitigation workflows that were performed to mitigate the historical technical issue are identified. Each historical mitigation workflow includes historical mitigation operation(s). Examples of a mitigation operation include execution of a PowerShell script, execution of a query (e.g., a domain name server (DNS) lookup or a diagnostic query such as an Azure Data Explorer query), execution of a command (e.g., a command line interface command) to change a state of a device or system, execution of an application programming interface (API) request, retrieval of a stack trace, and access of a uniform resource identifier (URI). An Azure Data Explorer query (e.g., a Kusto query) is a query that is implemented using a Microsoft® Azure® Data Explorer query language. Examples of a URI include a uniform resource name (URN) and a uniform resource label (URL). A historical mitigation operation is a mitigation operation that was performed in the past. For instance, each historical mitigation operation may have been performed by a user or a bot. In an example implementation, the workflow identification logic 414 identifies the historical mitigation workflows. For instance, the workflow identification logic 414 may analyze the historical issue information 446, which identifies various historical mitigation operations, and the historical issue identifiers 438 using a ML technique to identify the historical mitigation workflows that were performed to mitigate the respective historical technical issues. The workflow identification logic 414 may generate workflow information 440 to indicate the historical mitigation workflows. The workflow information 440 may indicate the historical mitigation operation(s) that are included in each of the historical mitigation workflows.

At step 206, a relevance of each historical mitigation operation in the historical mitigation workflows is determined. In an example, multiple instances of a historical mitigation operation may have different parameters, so long as the instances have a common (e.g., same) structure. In an example implementation, the relevance logic 416 determines the relevance of each historical mitigation operation in the historical mitigation workflows. For instance, workflow information 440 may indicate each instance of each historical mitigation operation among the historical mitigation workflows. The relevance logic 416 may analyze the workflow information 440 to determine the relevance of each historical mitigation operation by counting the number of instances of the respective historical mitigation operation among the historical mitigation workflow(s) that is indicated therein, by determining a likelihood of success of the respective historical mitigation operation (e.g., a likelihood that the respective historical mitigation operation will mitigate the corresponding historical technical issue) indicated therein, and/or by determining an impact of the respective historical mitigation operation (e.g., an extent to which the respective historical mitigation operation mitigated the corresponding historical technical issue) indicated therein. The relevance logic 416 may generate operation information 442 to indicate the relevance of each historical mitigation operation that is included among the historical mitigation workflows. For example, the relevance logic 416 may indicate a number of instances of each historical mitigation operation, the likelihood of success of the respective historical mitigation operation, and/or the impact of the respective historical mitigation operation. In accordance with this example, the relevance may be a numerical value that is calculated using an algorithm that is based on any one or more of the aforementioned factors and/or one or more other factors.

At step 208, a mitigation workflow, which is configured to mitigate the current technical issue, is generated by selecting the historical mitigation operations based at least in part on each historical mitigation operation having a relevance that satisfies a relevance criterion. For instance, the historical mitigation operations may be selected based at least in part on each historical mitigation operation having a relevance that is greater than or equal to a relevance threshold. For example, the number threshold may be set such that the subset includes N historical mitigation operations, which have the N highest relevances among the historical mitigation operations. N may be set to equal any suitable positive number (e.g., 3, 5, 10, or 25). In accordance with this example, a first historical mitigation operation in the subset may have the highest relevance; a second historical mitigation operation in the subset may have the next highest relevance, and so on. In an example implementation, the selection logic 418 generates a mitigation workflow 452 by selecting (e.g., aggregating) the historical mitigation operations. For instance, the selection logic 418 may analyze the operation information 442 to determine the relevance of each historical mitigation operation that is included among the historical mitigation workflows. The selection logic 418 may compare the relevance of each historical mitigation operation that is included among the historical mitigation workflows, as indicated by the operation information 442, to the relevance criterion. The selection logic 418 incorporates each historical mitigation operation having a relevance that satisfies the relevance criteria into the mitigation workflow. The selection logic 418 does not incorporate each historical mitigation operation having a relevance that does not satisfy the relevance criterion into the mitigation workflow.

In an example embodiment, the mitigation workflow is generated at step 208 by ordering the historical mitigation operations to provide step-by-step instructions to mitigate the current technical issue.

In another example embodiment, the mitigation workflow is generated at step 208 by selecting the historical mitigation operations further based at least in part on each historical mitigation operation being included in a historical mitigation workflow that mitigated the corresponding historical technical issue to an extent that is greater than or equal to an extent threshold. The extent threshold may be any suitable value (e.g., 90%, 95%, or 99%).

In yet another example embodiment, the current technical issue is a live event, and the mitigation workflow is generated at step 208 for mitigation of the live event. For instance, the mitigation workflow may be executed to mitigate the live event.

In still another example embodiment, the current technical issue is a hypothetical event (e.g., a predicted future event), and the mitigation workflow is generated at step 208 for mitigation of the hypothetical event. For instance, the mitigation workflow may be executed offline.

In another example embodiment, steps 202, 204, and 206 are performed by querying logs that are generated by any one or more computing services, which include the computing service, and/or logs that are generated by a common computing device. Any one or more of the logs may be automatically generated by any one or more computing services, including the computing service. Any one or more of the logs may be automatically generated by a computing system that runs the computing service and/or other computing service(s). Any one or more of the logs may be generated by a user who interacts with (e.g., manages) the computing service and/or other computing service(s). Any one or more of the logs may be written in response to occurrence of a technical issue. Each log may have a title and indicate any of a variety of types of information, including a computing service that encounters a technical issue (e.g., error), one or more machines that are affected by a technical issue, a type of the technical issue, a time at which the technical issue began, a time range in which the technical issue occurred, users who are notified of the technical issue, mitigation operations that were performed to mitigate the technical issue, users initiating the mitigation operations, parameters analyzed by those users, and/or a recording of a user's mitigation session. A user's mitigation session is a computer session during which the user initiates or performs mitigation operation(s) to mitigate a technical issue. Information in each log may be retrieved from a document (e.g., a Word document), an email, a screen capture, or an incident management system.

In yet another example embodiment, making the determination at step 202 includes determining that a plurality of historical technical issues that were encountered by one or more first computing services are related to the current technical issue based at least in part on a confidence factor associated with each historical technical issue of the plurality of historical technical issues being greater than or equal to the confidence threshold. In accordance with this embodiment, each confidence factor represents a confidence that one or more first attributes of each historical technical issue correspond to one or more second attributes of the current technical issue. In further accordance with this embodiment, identifying the historical mitigation workflows at step 204 includes identifying a plurality of historical mitigation workflows that were performed to mitigate the plurality of historical technical issues. Each of the plurality of historical mitigation workflows includes one or more historical mitigation operations. In further accordance with this embodiment, determining the relevance at step 206 includes determining a relevance of each historical mitigation operation in each of the plurality of historical mitigation workflows. In further accordance with this embodiment, generating the mitigation workflow at step 208 includes selecting a subset of the historical mitigation operations that are included among the plurality of mitigation workflows based at least in part on each historical mitigation operation in the subset having a relevance that satisfies a relevance criterion.

In some example embodiments, one or more steps 202, 204, 206, and/or 208 of flowchart 200 are not performed. Moreover, steps in addition to or in lieu of steps 202, 204, 206, and/or 208 may be performed. For instance, in an example embodiment, the method of flowchart 200 further includes determining an extent to which the historical technical issue(s) negatively impacted performance of the first computing service. For example, the determination may be performed using rules (e.g., regular expression-based parser) or a ML technique. In an example implementation, the determination logic 420 determines the extent to which the historical technical issue(s) negatively impacted performance of the first computing service. For example, the determination logic 420 may analyze the historical issue information 446, which indicates the extent to which the historical technical issue(s) negatively impacted performance of the first computing service, to determine whether the mitigation workflow 452 is to be generated. In accordance with this example, the historical issue information 446 may identify decreases in the performance of the one or more computing services and attribute one or more of the decreases to any one or more of the historical technical issue(s). In further accordance with this example, the historical issue information 446 may indicate the extent of each decrease in the performance of the first computing service. The determination logic 420 may generate a generation instruction 444, which instructs the selection logic 418 to generate the mitigation workflow 452, based at least in part on the extent to which the historical technical issue negatively impacted the performance of the first computing service being greater than or equal to an extent threshold. For example, the determination logic 420 may compare the extent for each of the historical technical issue(s) to the extent threshold to determine whether the mitigation workflow 452 is to be generated. In another example, the determination logic 420 compares a combined (e.g., average or cumulative) extent for the historical technical issue(s) to the extent threshold to determine whether the mitigation workflow 452 is to be generated.

In accordance with this embodiment, generating the mitigation workflow at step 208 is based at least in part on the extent to which the historical technical issue(s) negatively impacted the performance of the first computing service being greater than or equal to an extent threshold. In an example implementation, the selection logic 418 generates the mitigation workflow 452 based at least in part on the extent to which the historical technical issue(s) negatively impacted the performance of the first computing service being greater than or equal to an extent threshold. For instance, the selection logic 418 may generate the mitigation workflow 452 based on receipt of the generation instruction 444.

In another example embodiment, the method of flowchart 200 further includes generating a tracking cookie that is configured to create a record of operations that are performed by a user who manages the first computing service. For instance, the tracking cookie may include session data that indicates operations that are performed by the user during a computer session of the user. In an example implementation, the cookie logic 424 generates a tracking cookie 456, which is configured to record the operations that are performed by the user. In accordance with this embodiment, identifying the historical mitigation workflows at step 204 and determining the relevance of each historical mitigation operation at step 206 are performed by analyzing the tracking cookie. In an example implementation, the historical issue information 446 includes the tracking cookie 456. In accordance with this implementation, the workflow identification logic 414 analyzes the tracking cookie 456 to identify the historical mitigation workflows, and the relevance logic 416 analyzes the tracking cookie 456 to determine the relevance of each historical mitigation operation.

In yet another example embodiment, the method of flowchart 200 further includes identifying the historical technical issues by analyzing user-generated information that specifies the historical technical issue. In an example implementation, the relation logic 412 analyzes the user-generated information 450 in the historical issue information 446 to identify the historical technical issue specified therein. In accordance with this embodiment, the historical mitigation workflows are identified at step 204 based at least in part on the user-generated information further specifying the historical mitigation operations. In an example implementation, the workflow identification logic 414 identifies the historical mitigation workflows based at least in part on the user-generated information 450 further specifying the historical mitigation operations.

In still another example embodiment, the method of flowchart 200 further includes categorizing a plurality of identified historical technical issues among a plurality of issue categories, which correspond to a plurality of respective subsets of attributes of the plurality of respective identified historical technical issues, such that each issue category of the plurality of issue categories includes at least one identified historical technical issue of the plurality of identified historical technical issues. In an example implementation, the categorization logic 426 categorizes the plurality of identified historical technical issues among the plurality of issue categories. The categorization logic 426 may generate categorization information 436 to indicate the issue categories and to further indicate which of the plurality of identified historical technical issues is categorized into each of the issue categories. In accordance with this embodiment, determining the historical technical issue is determined to be related to the current technical issue at step 202 is further based at least in part on the historical technical issue being categorized into a particular issue category of the plurality of issue categories. In an example implementation, the relation logic 412 analyzes the categorization information 436 to determine that the historical technical issue that was encountered by the first computing services is categorized into the particular issue category. In accordance with this implementation, the relation logic 412 determines that the historical issue is related to the current technical issue further based at least in part on the categorization information 436 indicating that the historical technical issue is categorized into the particular issue category.

In another embodiment, the method of flowchart 200 further includes determining a risk of failure of each historical mitigation operation in the historical mitigation workflows. For example, the determination may be performed using rules (e.g., regular expression-based parser) or a ML technique. In an example implementation, the determination logic 420 determines the risk of failure of each historical mitigation operation in the historical mitigation workflows. For example, the determination logic 420 may analyze the historical issue information 446, which indicates a likelihood that each historical mitigation operation will fail, to determine whether the respective historical mitigation operation is selected to be incorporated into the mitigation workflow 452. In accordance with this example, the historical issue information 446 may identify instances in which each historical mitigation operation failed and conditions under which the respective historical mitigation operation failed. The determination logic 420 may generate a generation instruction 444, which instructs the selection logic 418 to incorporate any one or more historical mitigation operations into the mitigation workflow 452, based at least in part on the risk of failure of the respective mitigation operation being less than or equal to a risk threshold.

In accordance with this embodiment, the mitigation workflow is generated at step 208 by selecting the historical mitigation operations further based at least in part on the risk of failure of each historical mitigation operation being less than or equal to a risk threshold. In an example implementation, the selection logic 418 generates the mitigation workflow 452 by selecting the historical mitigation operations further based at least in part on the risk of failure of each historical mitigation operation being less than or equal to the risk threshold. For instance, the selection logic 418 may generate the mitigation workflow 452 by selecting the historical mitigation operations based on receipt of the generation instruction 444.

In yet another embodiment, the method of flowchart 200 further includes determining a likelihood that each historical mitigation operation in the historical mitigation workflows will negatively impact the second computing service. For example, the determination may be performed using rules (e.g., regular expression-based parser) or a ML technique. In an example implementation, the determination logic 420 determines the likelihood that each historical mitigation operation in the historical mitigation workflows will negatively impact the second computing service. For example, the determination logic 420 may analyze the historical issue information 446, which indicates the results that historical mitigation operations have had on the second computing service, to determine a likelihood that each historical mitigation operation in the historical mitigation workflows will negatively impact the second computing service. The determination logic 420 may determine whether each historical mitigation operation will be selected for incorporation into the mitigation workflow 452 based on the results indicated by the historical issue information 446. In accordance with this example, the determination logic 420 may generate a generation instruction 444, which instructs the selection logic 418 to incorporate any one or more historical mitigation operations into the mitigation workflow 452, based at least in part on the likelihood that the respective mitigation operation will negatively impact the second computing service being less than or equal to a likelihood threshold.

In accordance with this embodiment, the mitigation workflow is generated at step 208 by selecting the historical mitigation operations further based at least in part on the likelihood that each historical mitigation operation will negatively impact the second computing service being less than or equal to a likelihood threshold. In an example implementation, the selection logic 418 generates the mitigation workflow 452 by selecting the historical mitigation operations further based at least in part on the likelihood that each historical mitigation operation will negatively impact the second computing service being less than or equal to a likelihood threshold. For instance, the selection logic 418 may generate the mitigation workflow 452 by selecting the historical mitigation operations based on receipt of the generation instruction 444.

In still another example embodiment, the method of flowchart 200 further includes causing a visual representation of the mitigation workflow to be displayed to a user (e.g., an engineer). The visual representation includes selectable interface elements. Each selectable interface element represents a respective historical mitigation operation that is included in the mitigation workflow. In an example implementation, the visual representation logic 428 causes a visual representation of the mitigation workflow 452 to be displayed to the user. For instance, the visual representation logic 428 may generate visual representation information 458, which defines the visual representation including the selectable interface elements.

In accordance with this embodiment, the method of flowchart 200 further includes executing each historical mitigation operation that is represented by a selectable interface element in the visual representation that is selected by the user based on the respective selectable interface element being selected by the user. For instance, the method of flowchart 200 may further include not executing each historical mitigation operation that is represented by a selectable interface element in the visual representation that is not selected by the user based on the respective selectable interface element not being selected by the user. In an example implementation, the workflow execution logic 430 executes each historical mitigation operation that is represented by a selectable interface element in the visual representation that is selected by the user based on the respective selectable interface element being selected by the user. For instance, the workflow execution logic 430 may receive selection information 460, which indicates each selectable interface element in the visual representation that is selected by the user and which further indicates the historical mitigation operation that is represented by the respective selectable interface element. The workflow execution logic 430 may analyze the selection information 460 to determine which of the historical mitigation operations to execute based on the selection information 460 indicating that those mitigation operations represent selectable interface elements that have been selected.

In another example embodiment, the method of flowchart 200 further includes automatically executing the mitigation workflow to mitigate the current technical issue based on (e.g., as a result of) the mitigation workflow being generated. For instance, the workflow execution logic 430 may automatically execute the mitigation workflow based on the mitigation workflow being generated.

In yet another example embodiment, step 208 is replaced with one or more of the steps shown in flowchart 300 of FIG. 3. As shown in FIG. 3, the method of flowchart 300 begins at step 302. In step 302, a determination is made that the second computing service is dependent on a third service. In an example implementation, the operation generation logic 422 determines that the second computing service is dependent on the third service. For instance, the service dependency information 448 may indicate dependencies among a plurality of services, including the second computing service and the third service. The operation generation logic 422 may analyze the service dependency information 448 to determine that the second computing service is dependent on the third service. For instance, the service dependency information 448 may include a service graph that indicates the dependency of the second computing service on the third service.

At step 304, a determination is made that the third service is modified to include an update prior to the second computing service encountering the current technical issue. In an example implementation, the operation generation logic 422 determines that the third service is modified to include the update prior to the second computing service encountering the current technical issue. For instance, the operation generation logic 422 may receive update information, which indicates updates that are incorporated into services and times at which those updates are incorporated into those services. The operation generation logic 422 may analyze the update information 434 to determine that the third service was modified to include the update and the time at which the third service was modified to include the update. The operation generation logic 422 may compare the time at which the third service was modified to include the update, as indicated by the update information 434, and the time at which the second computing service encountered the current technical issue, as indicated by the current issue information 432, to determine that the third service was modified to include the update prior to the second computing service encountering the current technical issue.

At step 306, a mitigation workflow, which is configured to mitigate the current technical issue, is generated by selecting a plurality of mitigation operations, including a designated mitigation operation that is configured to modify the third service by performing an action on the update and further including the historical mitigation operations, based at least in part on each historical mitigation operation having a relevance that satisfies a relevance criterion and further based at least in part on a second confidence factor being greater than or equal to a second confidence threshold. For example, performing the action on the update may include deleting the update, rolling back the update, and/or pausing the update. In another example, the designated mitigation operation is selected to be incorporated into the mitigation workflow based at least in part on the second computing service being dependent on the third service. The second confidence factor represents a confidence that the third service being modified to include the update contributed to the current technical issue.

In an example implementation, the selection logic 418 generates the mitigation workflow 452 by selecting the plurality of mitigation operations. For example, the operation generation logic 422 may determine the confidence that the third service being modified to include the update contributed to the current technical issue. In accordance with this example, the operation generation logic 422 may analyze the current issue information 432, the historical issue information 446, and the update information 434 using a ML technique to determine the confidence. The operation generation logic 422 may generate the second confidence factor to represent the confidence, compare the second confidence factor to the second confidence threshold, and generate additional operation information 454 based at least in part on the second confidence factor being greater than or equal to the second confidence threshold. The additional operation information 454 indicates that the designated mitigation operation is to be performed. For instance, the additional operation information 454 may specify that the designated operation is configured to modify the third service by performing the action on the update. In accordance with this implementation, the selection logic 418 may generate the mitigation workflow 452 to include the designated mitigation operation based on receipt of the additional operation information 454 (e.g., based on the additional operation information 454 indicating the designated mitigation operation).

It will be recognized that the computing system 400 may not include one or more of the history-based generation logic 408, the store 410, the relation logic 412, the workflow identification logic 414, the relevance logic 416, the selection logic 418, the determination logic 420, the operation generation logic 422, the cookie logic 424, the categorization logic 426, the visual representation logic 428, and/or the workflow execution logic 430. Furthermore, the computing system 400 may include components in addition to or in lieu of the history-based generation logic 408, the store 410, the relation logic 412, the workflow identification logic 414, the relevance logic 416, the selection logic 418, the determination logic 420, the operation generation logic 422, the cookie logic 424, the categorization logic 426, the visual representation logic 428, and/or the workflow execution logic 430.

Figure 5:
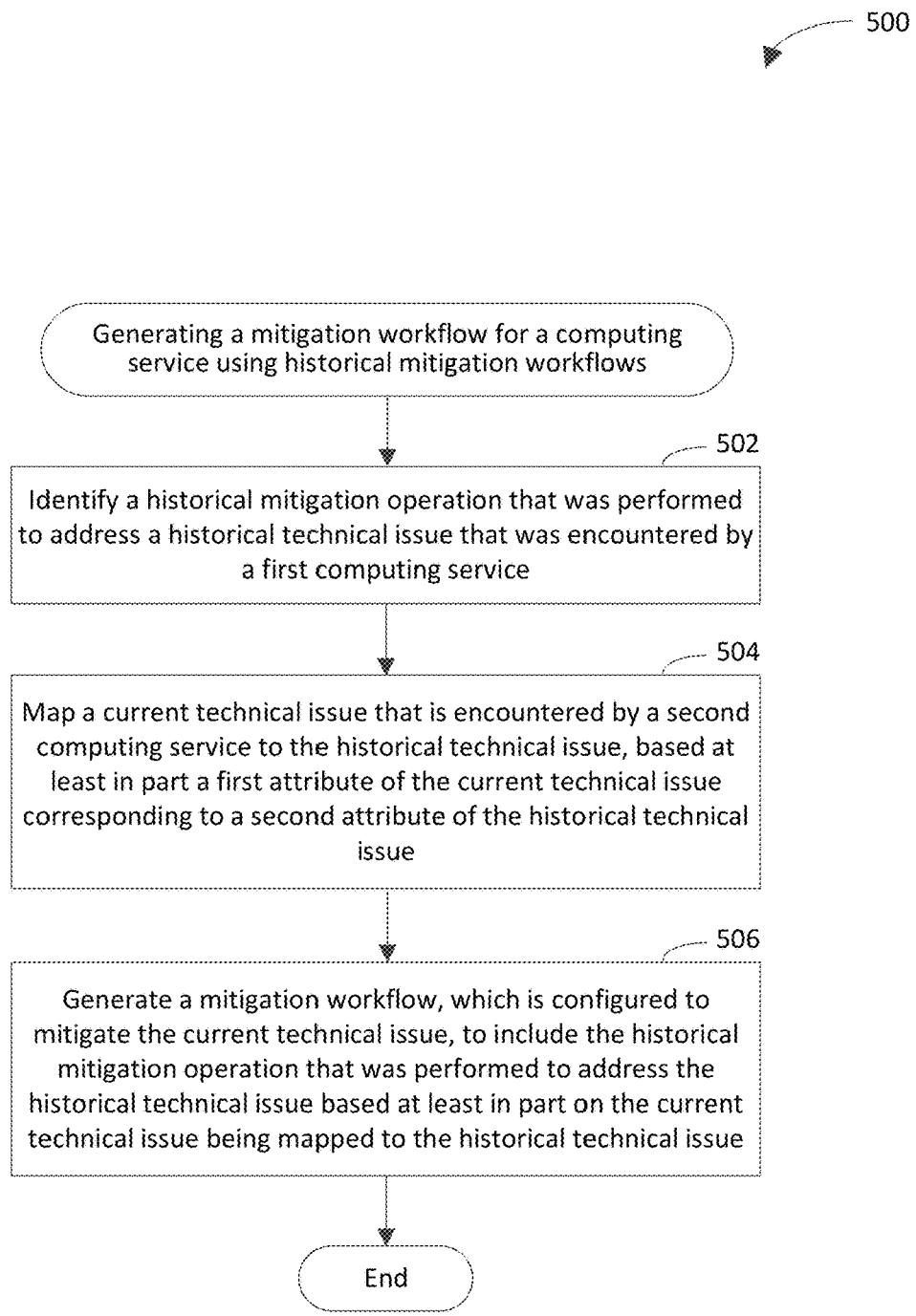
Figure 6:
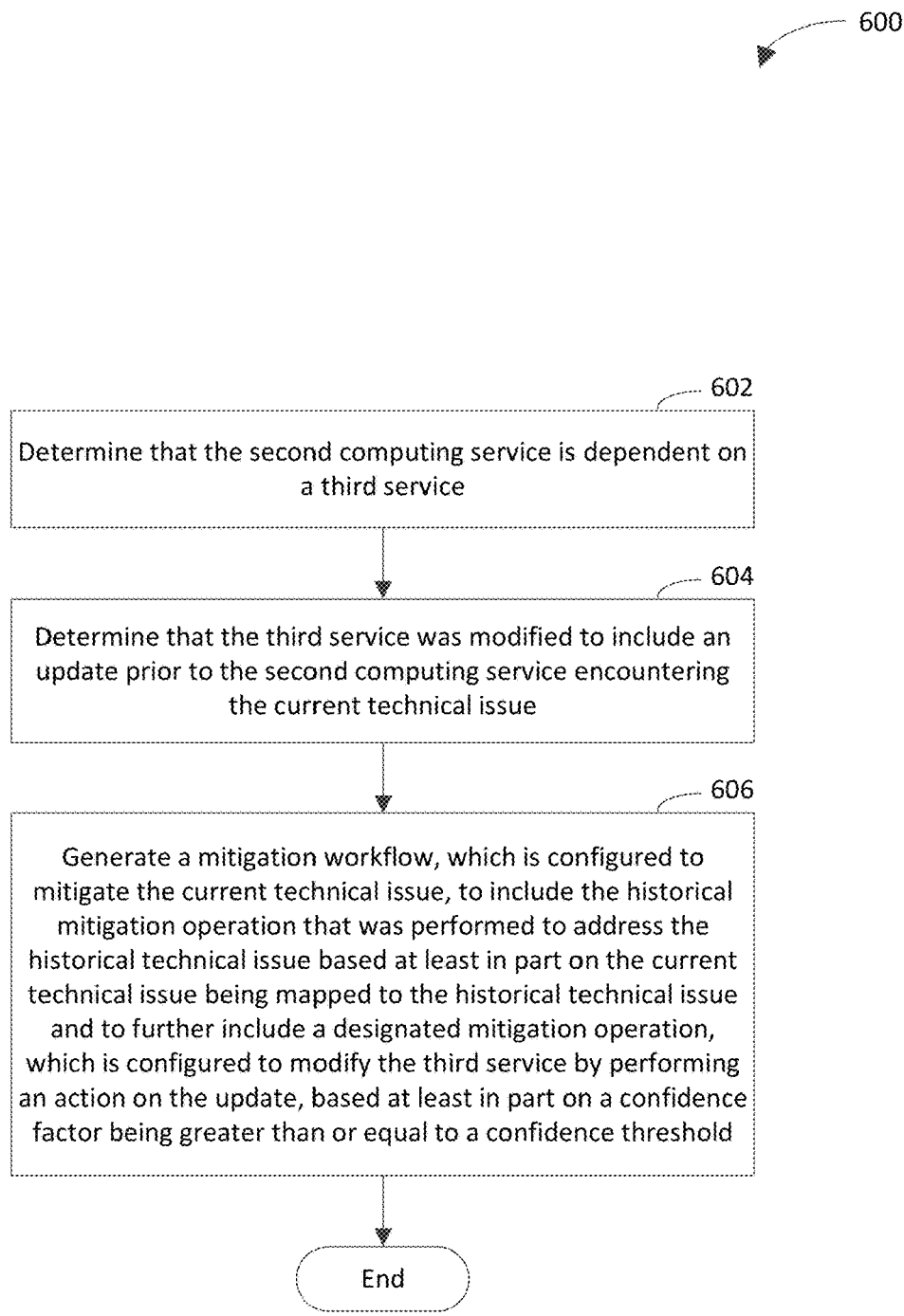
Figure 7:
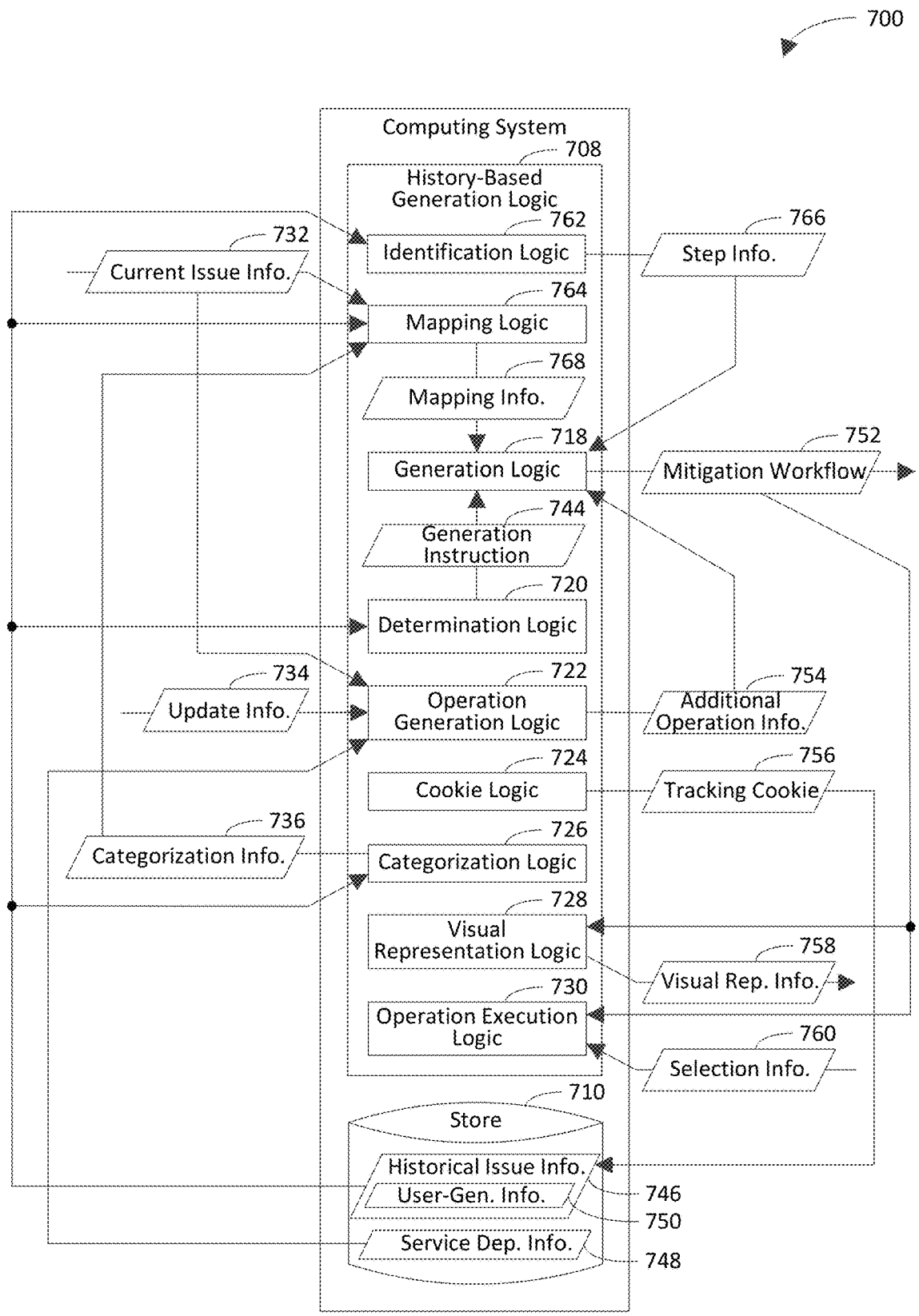

FIGS. 5-6 depict flowcharts 500 and 600 of example methods for generating a mitigation workflow for a computing service using historical mitigation workflows in accordance with embodiments. Flowcharts 500 and 600 may be performed by the first server(s) 106A, shown in FIG. 1, for example. For illustrative purposes, flowcharts 500 and 600 are described with respect to computing system 700 shown in FIG. 7, which is an example implementation of the first server(s) 106A. As shown in FIG. 7, the computing system 700 includes history-based generation logic 708 and a store 710. The history-based generation logic 708 includes identification logic 762, mapping logic 764, generation logic 718, determination logic 720, operation generation logic 722, cookie logic 724, categorization logic 726, visual representation logic 728, and operation execution logic 730. The store 710 may be any suitable type of store. The store 710 is shown to store historical issue information 746 and service dependency information 748 for illustrative purposes. The historical issue information 746 is shown to include user-generated information 750 for illustrative purposes. Further structural and operational embodiments will be apparent to persons skilled in the relevant art(s) based on the discussion regarding flowcharts 500 and 600.

As shown in FIG. 5, the method of flowchart 500 begins at step 502. In step 502, a historical mitigation operation that was performed to address a historical technical issue that was encountered by a first computing service is identified. Examples of a mitigation operation include execution of a PowerShell script, execution of a query (e.g., a domain name server (DNS) lookup or a diagnostic query such as an Azure Data Explorer query), execution of a command (e.g., a command line interface command) to change a state of a device or system), execution of an application programming interface (API) request, retrieval of a stack trace, and access of a uniform resource identifier (URI). An Azure Data Explorer query (e.g., a Kusto query) is a query that is implemented using a Microsoft® Azure® Data Explorer query language. Examples of a URI include a uniform resource name (URN) and a uniform resource label (URL). A historical mitigation operation is a mitigation operation that was performed in the past. For instance, each historical mitigation operation may have been performed by a user or a bot. Each computing service may be a cloud-based service, an on-premises enterprise service, or a hybrid enterprise service.

In an example implementation, the identification logic 762 identifies the historical mitigation operation that was performed to address the historical technical issue. For instance, the historical issue information 746 may indicate the historical technical issue and the historical mitigation operation. The identification logic 762 may retrieve the historical issue information 746 from the store 710 and analyze the historical issue information 746 using a ML technique to identify which historical mitigation operations correspond to which historical technical issues. The identification logic 762 may generate step information 766 to indicate which of the historical mitigation operations correspond to which historical technical issues. For instance, the step information 766 may cross-reference each historical technical issue with the corresponding historical mitigation operation(s) that were performed to mitigate the respective historical technical issue.

At step 504, a current technical issue that is encountered by a second computing service is mapped to the historical technical issue, based at least in part on a first attribute of the current technical issue corresponding to a second attribute of the historical technical issue. Examples of an attribute of a technical issue (e.g., a historical technical issue or a current technical issue) include a title of the technical issue, a type of the technical issue, a spatial attribute, and a temporal attribute. Example types of a technical issue, examples of a spatial attribute, and examples of a temporal attribute are described above with reference to step 202 of FIG. 2.

In an example implementation, the mapping logic 764 maps the current technical issue to the historical technical issue based at least in part on the first attribute of the current technical issue corresponding to the second attribute of the historical technical issue. For instance, the historical issue information 746 may indicate the attribute(s) of each historical technical issue. Accordingly, the mapping logic 764 may identify the attribute(s) of each historical technical issue by analyzing the historical issue information 746. Current issue information 732 may indicate the current technical issue and the attribute(s) of the current technical issue. For instance, the mapping logic 764 may obtain the current issue information 732 (e.g., any portion thereof) by monitoring performance of the second computing service in real-time and/or by retrieving the current issue information 732 from logs generated by the second computing service and/or logs generated by the computing system 700. The mapping logic 764 may compare the attribute(s) of each historical technical issue, as indicated by the historical issue information 746, to the attribute(s) of the current technical issue, as indicated by the current issue information 732, to determine which of the historical technical issues have attribute(s) that correspond to the attribute(s) of the current technical issue. For instance, the mapping logic 764 may analyze the attribute(s) of each historical technical issue and the attributes(s) of the current technical issue using a ML technique to determine the historical technical issue to which the current technical issue is to be mapped. The relation logic 712 may generate mapping information 768 to indicate the historical technical issue and the mapping of the current technical issue to the historical technical issue.

At step 506, a mitigation workflow, which is configured to mitigate the current technical issue, is generated to include the historical mitigation operation that was performed to address the historical technical issue based at least in part on the current technical issue being mapped to the historical technical issue. In an example implementation, the generation logic 718 generates a mitigation workflow 752 to include the historical mitigation operation that was performed to address the historical technical issue based at least in part on the current technical issue being mapped to the historical technical issue. For instance, the generation logic 718 may analyze the mapping information 768 to determine the historical technical issue to which the current technical issue is mapped. The generation logic 718 may analyze the step information 766 to determine which historical mitigation operations correspond to which historical technical issues. Thus, by analyzing the mapping information 768 and the step information 766, the generation logic 718 may determine the historical mitigation operation that was performed to address the historical technical issue. The generation logic 718 may generate the mitigation workflow 752 to include the historical mitigation operation as a result of determining the historical mitigation operation.

In an example embodiment, the mitigation workflow is generated at step 506 by ordering multiple historical mitigation operations to provide step-by-step instructions to mitigate the current technical issue.

In another example embodiment, the mitigation workflow is generated at step 506 to include the historical mitigation operation further based at least in part on the historical mitigation operation being included among historical mitigation operation(s) that mitigated the historical technical issue to an extent that is greater than or equal to an extent threshold. The extent threshold may be any suitable value (e.g., 92%, 97%, or 99.5%).

In yet another example embodiment, steps 502 and 504 are performed by querying logs that are generated by the first computing service, the second computing service, and/or other computing service(s) and/or logs that are generated by a common computing device. Any one or more of the logs may be automatically generated by the first computing service, the second computing service, and/or other computing service(s). Any one or more of the logs may be automatically generated by a computing system that runs the first computing service, the second computing service, and/or other computing service(s). Any one or more of the logs may be generated by a user who interacts with (e.g., manages) the first computing service, the second computing service, and/or other computing service(s). Any one or more of the logs may be written in response to occurrence of a technical issue. Each log may have a title and indicate any of a variety of types of information, including a computing service that encounters a technical issue (e.g., error), one or more machines that are affected by a technical issue, a type of the technical issue, a time at which the technical issue began, a time range in which the technical issue occurred, users who are notified of the technical issue, mitigation operations that were performed to mitigate the technical issue, users initiating the mitigation operations, parameters analyzed by those users, and/or a recording of a user's mitigation session. A user's mitigation session is a computer session during which the user initiates or performs mitigation operation(s) to mitigate a technical issue. Information in each log may be retrieved from a document (e.g., a Word document), an email, a screen capture, or an incident management system.

In still another example embodiment, identifying the historical mitigation operation at step 502 includes identifying a plurality of historical mitigation operations that were performed to address one or more historical technical issues that were encountered by one or more computing services. In accordance with this embodiment, mapping the current technical issue at step 504 includes mapping the current technical issue that is encountered by the second computing service to the one or more historical technical issues, based at least in part on one or more first attributes of the current technical issue corresponding to one or more second attributes of each historical technical issue. In further accordance with this embodiment, generating the mitigation workflow at step 506 includes generating the mitigation workflow to include at least a subset of the plurality of historical mitigation operations that were performed to address one or more historical technical issues based at least in part on the current technical issue being mapped to the historical technical issue. In an aspect of this embodiment, each historical mitigation operation is selectively included in the mitigation workflow based at least in part on whether the respective historical mitigation operation satisfies one or more other criteria (e.g., risk of failure being less than or equal to a risk threshold and/or likelihood of negatively impacting the second computing service being less than or equal to a likelihood threshold).

In some example embodiments, one or more steps 502, 504, and/or 506 of flowchart 500 are not performed. Moreover, steps in addition to or in lieu of steps 502, 504, and/or 506 may be performed. For instance, in an example embodiment, the method of flowchart 500 further includes determining an extent to which the historical technical issue negatively impacted performance of the first computing service. For example, the determination may be performed using rules (e.g., regular expression-based parser) or a ML technique. In an example implementation, the determination logic 720 determines the extent to which the historical technical issue negatively impacted performance of the first computing service. For example, the determination logic 720 may analyze the historical issue information 746, which indicates the extent to which the historical technical issues negatively impacted performance of the first computing service, to determine whether the mitigation workflow 752 is to be generated. In accordance with this example, the historical issue information 746 may identify decreases in the performance of the first computing service and attribute one or more of the decreases to any one or more historical technical issues. In further accordance with this example, the historical issue information 746 may indicate the extent of each decrease in the performance of the first computing service. The determination logic 720 may generate a generation instruction 744, which instructs the generation logic 718 to generate the mitigation workflow 752, based at least in part on the extent to which historical technical issue(s) negatively impacted the performance of the first computing service being greater than or equal to an extent threshold. For example, the determination logic 720 may compare the extent for each historical technical issue to the extent threshold to determine whether the mitigation workflow 752 is to be generated. In another example, the determination logic 720 may compare a combined (e.g., average or cumulative) extent for the historical technical issues to the extent threshold to determine whether the mitigation workflow 752 is to be generated.

In accordance with this embodiment, the extent to which the historical technical issue negatively impacted the performance of the first computing service is greater than or equal to an extent threshold. In an example implementation, the generation logic 718 generates the mitigation workflow 752 based at least in part on the extent to which the historical technical issue negatively impacted the performance of the first computing service being greater than or equal to an extent threshold. For instance, the generation logic 718 may generate the mitigation workflow 752 based on receipt of the generation instruction 744.

In another example embodiment, the method of flowchart 500 further includes generating a tracking cookie that is configured to create a record of operations that are performed by a user who manages the first computing service. For instance, the tracking cookie may include session data that indicates operations that are performed by the user during a computer session of the user. In an example implementation, the cookie logic 724 generates a tracking cookie 756, which is configured to record the operations that are performed by the user. In accordance with this embodiment, identifying the historical mitigation operation at step 502 is performed by analyzing the tracking cookie. In an example implementation, the historical issue information 746 includes the tracking cookie 756. In accordance with this implementation, the identification logic 762 analyzes the tracking cookie 756 to identify the historical mitigation operation.

In yet another example embodiment, the method of flowchart 500 further includes identifying the historical technical issues by analyzing user-generated information. In an example implementation, the identification logic 762 analyzes the user-generated information 750 in the historical issue information 746 to identify the historical technical issue specified therein. In accordance with this embodiment, identifying the historical mitigation operation at step 502 based at least in part on the user-generated information indicating that the historical mitigation operation was performed to mitigate the historical technical issue. In an example implementation, the identification logic 762 identifies the historical mitigation operation that was performed to mitigate the historical technical issue based at least in part on the user-generated information 750 indicating that the historical mitigation operation was performed to mitigate the historical technical issue.

In still another example embodiment, the method of flowchart 500 further includes categorizing a plurality of identified historical technical issues among a plurality of issue categories, which correspond to a plurality of respective subsets of attributes of the plurality of respective identified historical technical issues, such that each issue category of the plurality of issue categories includes at least one identified historical technical issue of the plurality of identified historical technical issues. In an example implementation, the categorization logic 726 categorizes the plurality of identified historical technical issues among the plurality of issue categories. The categorization logic 726 may generate categorization information 736 to indicate the issue categories and to further indicate which of the plurality of identified historical technical issues is categorized into each of the issue categories. In accordance with this embodiment, mapping the current technical issue to the historical technical issue at step 504 is performed based at least in part on the historical technical issue being categorized into a particular issue category of the plurality of issue categories. In an example implementation, the mapping logic 764 analyzes the categorization information 736 to determine that the historical technical issue is categorized into the particular issue category. In accordance with this implementation, the mapping logic 764 may map the current technical issue to the historical technical issue based at least in part on the categorization information 736 indicating that the historical technical issue is categorized into the particular issue category.

In another embodiment, the method of flowchart 500 further includes determining a risk of failure of the historical mitigation operation. For example, the determination may be performed using rules (e.g., regular expression-based parser) or a ML technique. In an example implementation, the determination logic 720 determines the risk of failure of the historical mitigation operation. For example, the determination logic 720 may analyze the historical issue information 746, which indicates a likelihood that any one or more historical mitigation operations will fail, to determine whether the historical mitigation operation is included in the mitigation workflow 752. In accordance with this example, the historical issue information 746 may identify instances in which each historical mitigation operation failed and conditions under which the respective historical mitigation operation failed. The determination logic 720 may generate a generation instruction 744, which instructs the generation logic 718 to include the historical mitigation operation in the mitigation workflow 752, based at least in part on the risk of failure of the mitigation operation being less than or equal to a risk threshold.

In accordance with this embodiment, the historical mitigation operation is included in the mitigation workflow at step 506 further based at least in part on the risk of failure of the historical mitigation operation being less than or equal to a risk threshold. In an example implementation, the generation logic 718 includes the historical mitigation operation in the mitigation workflow 752 further based at least in part on the risk of failure of the historical mitigation operation being less than or equal to the risk threshold. For instance, the selection logic 718 may include the historical mitigation operation in the mitigation workflow 752 based on receipt of the generation instruction 744.

In yet another embodiment, the method of flowchart 500 further includes determining a likelihood that the historical mitigation operation will negatively impact the second computing service. For example, the determination may be performed using rules (e.g., regular expression-based parser) or a ML technique. In an example implementation, the determination logic 720 determines the likelihood that the historical mitigation operation will negatively impact the second computing service. For example, the determination logic 720 may analyze the historical issue information 746, which indicates the results that historical mitigation operations have had on the second computing service, to determine a likelihood that the historical mitigation operation will negatively impact the second computing service. The determination logic 720 may determine whether the historical mitigation operation will be included in the mitigation workflow 752 based on the results indicated by the historical issue information 746. In accordance with this example, the determination logic 720 may generate a generation instruction 744, which instructs the selection logic 718 to incorporate the historical mitigation operation into the mitigation workflow 752, based at least in part on the likelihood that the mitigation operation will negatively impact the second computing service being less than or equal to a likelihood threshold.

In accordance with this embodiment, the historical mitigation operation is included in the mitigation workflow at step 208 further based at least in part on the likelihood that the historical mitigation operation will negatively impact the second computing service being less than or equal to a likelihood threshold. In an example implementation, the selection logic 718 includes the historical mitigation operation in the mitigation workflow 752 further based at least in part on the likelihood that the historical mitigation operation will negatively impact the second computing service being less than or equal to the likelihood threshold. For instance, the selection logic 718 may include the historical mitigation operation in the mitigation workflow 752 based on receipt of the generation instruction 744.

In still another example embodiment, the method of flowchart 500 further includes causing a visual representation of the mitigation workflow to be displayed to a user. The visual representation includes selectable interface elements. Each selectable interface element represents a respective historical mitigation operation that is included in the mitigation workflow. In an example implementation, the visual representation logic 728 causes a visual representation of the mitigation workflow 752 to be displayed to the user. For instance, the visual representation logic 728 may generate visual representation information 758, which defines the visual representation including the selectable interface elements.

In accordance with this embodiment, the method of flowchart 500 further includes executing each historical mitigation operation that is represented by a selectable interface element in the visual representation that is selected by the user based on the respective selectable interface element being selected by the user. For instance, the method of flowchart 500 may further include not executing each historical mitigation operation that is represented by a selectable interface element in the visual representation that is not selected by the user based on the respective selectable interface element not being selected by the user. In an example implementation, the operation execution logic 730 executes each historical mitigation operation that is represented by a selectable interface element in the visual representation that is selected by the user based on the respective selectable interface element being selected by the user. For instance, the operation execution logic 730 may receive selection information 760, which indicates each selectable interface element in the visual representation that is selected by the user and which further indicates the historical mitigation operation that is represented by the respective selectable interface element. The operation execution logic 730 may analyze the selection information 760 to determine which of the historical mitigation operations to execute based on the selection information 760 indicating that those mitigation operations represent selectable interface elements that have been selected.

In another example embodiment, the method of flowchart 500 further includes automatically executing the mitigation workflow to mitigate the current technical issue based on (e.g., as a result of) the mitigation workflow being generated. For instance, the operation execution logic 730 may automatically execute the mitigation workflow based on the mitigation workflow being generated.

In yet another example embodiment, step 506 is replaced with one or more of the steps shown in flowchart 600 of FIG. 6. As shown in FIG. 6, the method of flowchart 600 begins at step 602. In step 602, a determination is made that the second computing service is dependent on a third service. In an example implementation, the operation generation logic 722 determines that the second computing service is dependent on the third service. For instance, the service dependency information 748 may indicate dependencies among a plurality of services, including the second computing service and the third service. The operation generation logic 722 may analyze the service dependency information 748 to determine that the second computing service is dependent on the third service. For instance, the service dependency information 748 may include a service graph that indicates the dependency of the second computing service on the third service.

At step 604, a determination is made that the third service is modified to include an update prior to the second computing service encountering the current technical issue. In an example implementation, the operation generation logic 722 determines that the third service is modified to include the update prior to the second computing service encountering the current technical issue. For instance, the operation generation logic 722 may receive update information, which indicates updates that are incorporated into services and times at which those updates are incorporated into those services. The operation generation logic 722 may analyze the update information 734 to determine that the third service was modified to include the update and the time at which the third service was modified to include the update. The operation generation logic 722 may compare the time at which the third service was modified to include the update, as indicated by the update information 734, and the time at which the second computing service encountered the current technical issue, as indicated by the current issue information 732, to determine that the third service was modified to include the update prior to the second computing service encountering the current technical issue.

At step 606, a mitigation workflow, which is configured to mitigate the current technical issue, is generated to further include a designated mitigation operation that is configured to modify the third service by performing an action on the update, based at least in part on a confidence factor being greater than or equal to a confidence threshold. For example, performing the action on the update may include deleting the update, rolling back the update, and/or pausing the update. In another example, the designated mitigation operation is included in the mitigation workflow based at least in part on the second computing service being dependent on the third service. The confidence factor represents a confidence that the third service being modified to include the update contributed to the current technical issue. In an example implementation, the generation logic 718 generates the mitigation workflow 752 to further include the designated mitigation based at least in part on the confidence factor being greater than or equal to the confidence threshold. For example, the operation generation logic 722 may determine the confidence that the third service being modified to include the update contributed to the current technical issue. In accordance with this example, the operation generation logic 722 may analyze the current issue information 732, the historical issue information 746, and the update information 734 using a ML technique to determine the confidence. The operation generation logic 722 may generate the confidence factor to represent the confidence, compare the confidence factor to the confidence threshold, and generate additional operation information 754 based at least in part on the confidence factor being greater than or equal to the confidence threshold. The additional operation information 754 indicates that the designated mitigation operation is to be performed. For instance, the additional operation information 754 may specify that the designated operation is configured to modify the third service by performing the action on the update. In accordance with this implementation, the generation logic 718 generates the mitigation workflow 752 to include the designated mitigation operation based on receipt of the additional operation information 754 (e.g., based on the additional operation information 754 indicating the designated mitigation operation).

It will be recognized that the computing system 700 may not include one or more of the history-based generation logic 708, the store 710, the identification logic 762, the mapping logic 764, the generation logic 718, the determination logic 720, the operation generation logic 722, the cookie logic 724, the categorization logic 726, the visual representation logic 728, and/or the operation execution logic 730. Furthermore, the computing system 700 may include components in addition to or in lieu of the history-based generation logic 708, the store 710, the identification logic 762, the mapping logic 764, the generation logic 718, the determination logic 720, the operation generation logic 722, the cookie logic 724, the categorization logic 726, the visual representation logic 728, and/or the operation execution logic 730.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the history-based generation logic 108, the history-based generation logic 408, the store 410, the relation logic 412, the workflow identification logic 414, the relevance logic 416, the selection logic 418, the determination logic 420, the operation generation logic 422, the cookie logic 424, the categorization logic 426, the visual representation logic 428, the workflow execution logic 430, the history-based generation logic 708, the store 710, the identification logic 762, the mapping logic 764, the generation logic 718, the determination logic 720, the operation generation logic 722, the cookie logic 724, the categorization logic 726, the visual representation logic 728, the operation execution logic 730, flowchart 200, flowchart 300, flowchart 500, and/or flowchart 600 may be implemented in hardware, software, firmware, or any combination thereof.

For example, any one or more of the history-based generation logic 108, the history-based generation logic 408, the store 410, the relation logic 412, the workflow identification logic 414, the relevance logic 416, the selection logic 418, the determination logic 420, the operation generation logic 422, the cookie logic 424, the categorization logic 426, the visual representation logic 428, the workflow execution logic 430, the history-based generation logic 708, the store 710, the identification logic 762, the mapping logic 764, the generation logic 718, the determination logic 720, the operation generation logic 722, the cookie logic 724, the categorization logic 726, the visual representation logic 728, the operation execution logic 730, flowchart 200, flowchart 300, flowchart 500, and/or flowchart 600 may be implemented, at least in part, as computer program code configured to be executed in a processing system.

In another example, any one or more of the history-based generation logic 108, the history-based generation logic 408, the store 410, the relation logic 412, the workflow identification logic 414, the relevance logic 416, the selection logic 418, the determination logic 420, the operation generation logic 422, the cookie logic 424, the categorization logic 426, the visual representation logic 428, the workflow execution logic 430, the history-based generation logic 708, the store 710, the identification logic 762, the mapping logic 764, the generation logic 718, the determination logic 720, the operation generation logic 722, the cookie logic 724, the categorization logic 726, the visual representation logic 728, the operation execution logic 730, flowchart 200, flowchart 300, flowchart 500, and/or flowchart 600 may be implemented, at least in part, as hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), and a complex programmable logic device (CPLD). For instance, a SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

Figure 8:
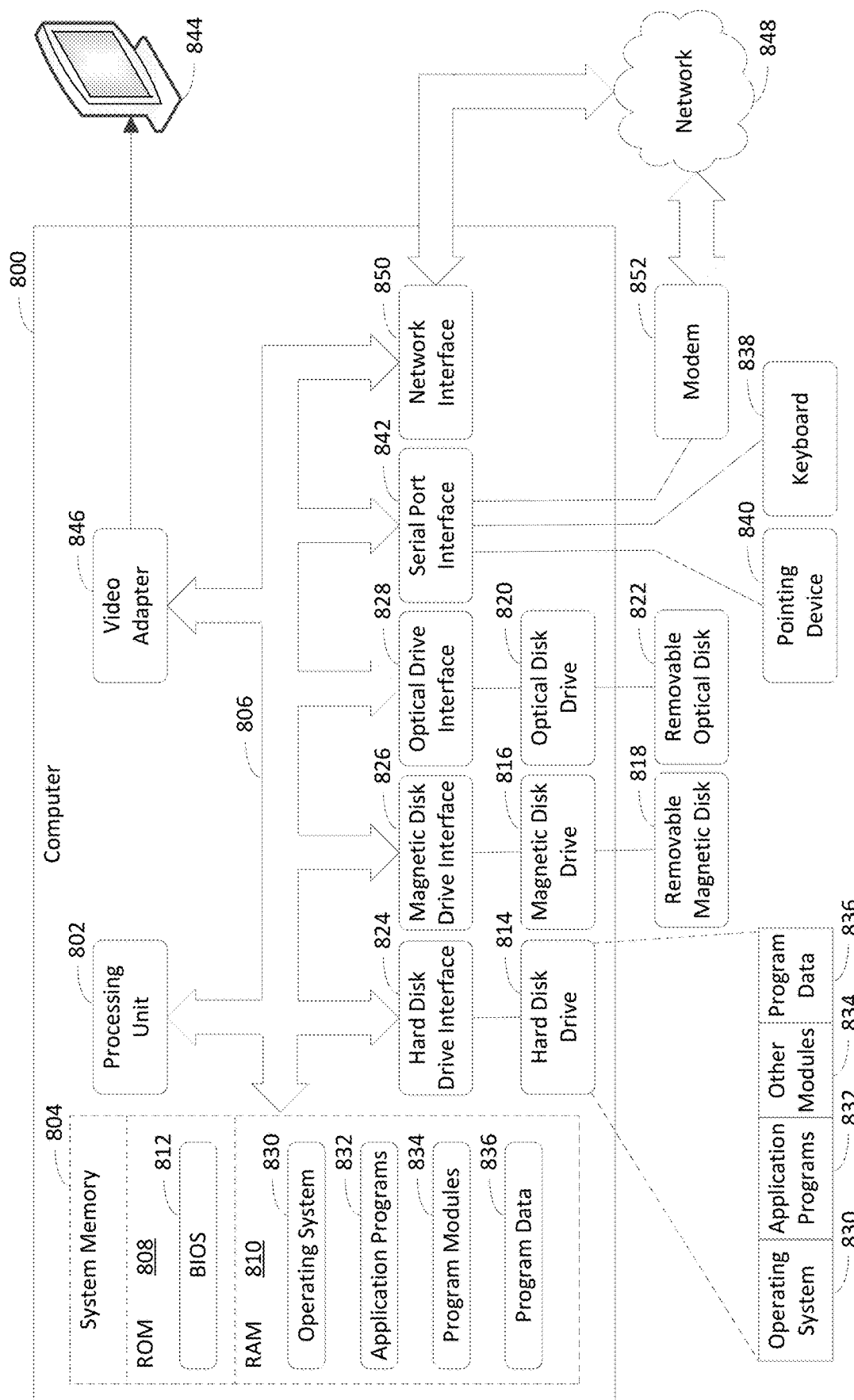
FIG. 8 depicts an example computer in which embodiments may be implemented.

II. Further Discussion of Some Example Embodiments (A1) A first example system (FIG. 1, 102A-102M, 106A-106N; FIG. 4, 400; FIG. 8, 800) comprises a memory (FIG. 8, 804, 808, 810) and a processing system (FIG. 8, 802) coupled to the memory. The processing system is configured to determine (FIG. 2, 202) that historical technical issues that were encountered by one or more computing services are related to a current technical issue that is encountered by a computing service based at least in part on confidence factors associated with the respective historical technical issues being greater than or equal to a confidence threshold. Each confidence factor represents a confidence that one or more attributes of the respective historical technical issue correspond to one or more attributes of the current technical issue. The processing system is further configured to identify (FIG. 2, 204) historical mitigation workflows that were performed to mitigate the respective historical technical issues. Each historical mitigation workflow includes one or more historical mitigation operations. The processing system is further configured to determine (FIG. 2, 206) a relevance of each historical mitigation operation that is included among the historical mitigation workflows. The processing system is further configured to generate (FIG. 2, 208) a mitigation workflow (FIG. 4, 452), which is configured to mitigate the current technical issue, by aggregating a subset of the historical mitigation operations based at least in part on each historical mitigation operation in the subset having a relevance that satisfies a relevance criterion.

(A2) In the system of A1, wherein the processing system is configured to: determine whether the mitigation workflow is to be generated based at least in part on an extent to which the historical technical issues negatively impacted performance of the one or more computing services; and generate the mitigation workflow based at least in part on the extent to which the historical technical issues negatively impacted the performance of the computing service being greater than or equal to an extent threshold.

(A3) In the system of any of A1-A2, wherein the processing system is configured to: generate a tracking cookie that is configured to create a record of operations that are performed by a user who manages at least one of the one or more computing services; and analyze the tracking cookie to identify the historical mitigation workflows and to determine the relevance of each historical mitigation operation that is included among the historical mitigation workflows.

(A4) In the system of any of A1-A3, wherein the processing system is configured to: identify the historical technical issues by analyzing user-generated information that specifies at least one historical technical issue that is included among the historical technical issues; and identify at least one historical mitigation workflow that was performed to mitigate the at least one historical technical issue based at least in part on the user-generated information further specifying one or more historical mitigation operations that are included in the at least one historical mitigation workflow.

(A5) In the system of any of A1-A4, wherein the processing system is configured to: determine that the computing service is dependent on a second service; determine that the second service is modified to include an update prior to the computing service encountering the current technical issue; and generate the mitigation workflow by aggregating a plurality of mitigation operations, including a designated mitigation operation that is configured to modify the second service by performing an action on the update and further including the subset of the historical mitigation operations, based at least in part on a second confidence factor being greater than or equal to a second confidence threshold, the second confidence factor representing a confidence that the second service being modified to include the update contributed to the current technical issue.

(A6) In the system of any of A1-A5, wherein the processing system is configured to: categorize a plurality of identified historical technical issues among a plurality of issue categories, which correspond to a plurality of respective subsets of attributes of the plurality of respective identified historical technical issues, such that each issue category includes at least one of the plurality of identified historical technical issues; and determine that the historical technical issues that were encountered by the one or more computing services are related to the current technical issue that is encountered by the computing service further based at least in part on the historical technical issues that were encountered by the one or more computing services being categorized into a common issue category that is included in the plurality of issue categories.

(A7) In the system of any of A1-A6, wherein the processing system is configured to: generate the mitigation workflow by aggregating the subset of the historical mitigation operations further based at least in part on each historical mitigation operation in the subset being included in a historical mitigation workflow that mitigated the corresponding historical technical issue to an extent that is greater than or equal to an extent threshold.

(A8) In the system of any of A1-A7, wherein the processing system is configured to: determine a number of instances of each historical mitigation operation that is included among the historical mitigation workflows; and generate the mitigation workflow by aggregating the subset of the historical mitigation operations based at least in part on each historical mitigation operation in the subset having a number of instances among the historical mitigation workflows that is greater than or equal to a number threshold.

(A9) In the system of any of A1-A8, wherein the processing system is configured to: determine a likelihood of success of each historical mitigation operation that is included among the historical mitigation workflows; and generate the mitigation workflow by aggregating the subset of the historical mitigation operations based at least in part on each historical mitigation operation in the subset having a likelihood of success that is greater than or equal to a likelihood threshold.

(A10) In the system of any of A1-A9, wherein the processing system is configured to: determine an impact of each historical mitigation operation that is included among the historical mitigation workflows; and generate the mitigation workflow by aggregating the subset of the historical mitigation operations based at least in part on each historical mitigation operation in the subset having an impact that is greater than or equal to an impact threshold.

(A11) In the system of any of A1-A10, wherein the processing system is further configured to: cause a visual representation of the mitigation workflow to be displayed to a user, the visual representation including a plurality of selectable interface elements, each selectable interface element representing a respective historical mitigation operation that is included in the mitigation workflow; and execute each historical mitigation operation that is represented by a selectable interface element in the visual representation that is selected by the user based on the respective selectable interface element being selected by the user.

(A12) In the system of any of A1-A11, wherein the processing system is further configured to: automatically execute the mitigation workflow to mitigate the current technical issue based on the mitigation workflow being generated.

(B1) A second example system (FIG. 1, 102A-102M, 106A-106N; FIG. 7, 700; FIG. 8, 800) comprises a memory (FIG. 8, 804, 808, 810) and a processing system (FIG. 8, 802) coupled to the memory. The processing system is configured to identify (FIG. 5, 502) historical mitigation operations that were performed to address historical technical issues that were encountered by one or more computing services. The processing system is further configured to map (FIG. 5, 504) a current technical issue that is encountered by a computing service to one or more identified technical issues, which are included among the historical technical issues, based at least in part on one or more attributes of the current technical issue corresponding to one or more attributes of each identified technical issue. The processing system is further configured to generate (FIG. 5, 506) a mitigation workflow (FIG. 7, 752), which is configured to mitigate the current technical issue, to include a subset of the historical mitigation operations that was performed to address the one or more identified technical issues based at least in part on the current technical issue being mapped to the one or more identified technical issues.

(B2) In the system of B1, wherein the processing system is configured to: determine whether the mitigation workflow is to be generated based at least in part on an extent to which the historical technical issues negatively impacted performance of the one or more computing services; and generate the mitigation workflow based at least in part on the extent to which the historical technical issues negatively impacted the performance of the computing service being greater than or equal to an extent threshold.

(B3) In the system of any of B1-B2, wherein the processing system is configured to: generate a tracking cookie that is configured to create a record of operations that are performed by a user who manages at least one of the one or more computing services; and identify the historical mitigation operations by analyzing the tracking cookie.

(B4) In the system of any of B1-B3, wherein the processing system is configured to: identify the historical technical issues by analyzing user-generated information that specifies at least one historical technical issue that is included among the historical technical issues; and identify at least one historical mitigation operation that was performed to mitigate the at least one historical technical issue based at least in part on the user-generated information indicating that the at least one historical mitigation operation was performed to mitigate the at least one historical technical issue.

(B5) In the system of any of B1-B4, wherein the processing system is configured to: determine that the computing service is dependent on a second service; determine that the second service is modified to include an update prior to the computing service encountering the current technical issue; and generate the mitigation workflow to further include a designated mitigation operation that is configured to modify the second service by performing an action on the update, based at least in part on a confidence factor being greater than or equal to a confidence threshold, the confidence factor representing a confidence that the second service being modified to include the update contributed to the current technical issue.

(B6) In the system of any of B1-B5, wherein the processing system is configured to: categorize a plurality of identified historical technical issues among a plurality of issue categories, which correspond to a plurality of respective subsets of attributes of the plurality of respective identified historical technical issues, such that each issue category includes at least one of the plurality of identified historical technical issues; and map the current technical issue that is encountered by the computing service to the one or more identified technical issues based at least in part on the one or more identified technical issues being categorized into a common issue category that is included in the plurality of issue categories.

(B7) In the system of any of B1-B6, wherein the processing system is configured to: generate the mitigation workflow to include the subset of the historical mitigation operations further based at least in part on each historical mitigation operation in the subset being included among historical mitigation operations that mitigated the corresponding historical technical issue to an extent that is greater than or equal to an extent threshold.

(B8) In the system of any of B1-B7, wherein the processing system is further configured to: cause a visual representation of the mitigation workflow to be displayed to a user, the visual representation including a plurality of selectable interface elements, each selectable interface element representing a respective historical mitigation operation that is included in the mitigation workflow; and execute each historical mitigation operation that is represented by a selectable interface element in the visual representation that is selected by the user based on the respective selectable interface element being selected by the user.

(B9) In the system of any of B1-B8, wherein the processing system is further configured to: automatically execute the mitigation workflow to mitigate the current technical issue based on the mitigation workflow being generated.

(C1) A third example system (FIG. 1, 102A-102M, 106A-106N; FIG. 4, 400; FIG. 8, 800) comprises a memory (FIG. 8, 804, 808, 810) and a processing system (FIG. 8, 802) coupled to the memory. The processing system is configured to determine (FIG. 2, 202) that a historical technical issue that was encountered by a first computing service is related to a current technical issue that is encountered by a second computing service based at least in part on a confidence factor associated with the historical technical issue being greater than or equal to a confidence threshold. The confidence factor represents a confidence that a first attribute of the historical technical issue corresponds to a second attribute of the current technical issue. The processing system is further configured to identify (FIG. 2, 204) historical mitigation workflows that were performed to mitigate the historical technical issue. Each historical mitigation workflow includes a historical mitigation operation. The processing system is further configured to determine (FIG. 2, 206) a relevance of each historical mitigation operation in the historical mitigation workflows. The processing system is further configured to generate (FIG. 2, 208) a mitigation workflow (FIG. 4, 452), which is configured to mitigate the current technical issue, by selecting the historical mitigation operations based at least in part on each historical mitigation operation having a relevance that satisfies a relevance criterion.

(C2) In the system of C1, wherein the processing system is further configured to: determine an extent to which the historical technical issue negatively impacted performance of the first computing service; and wherein the extent to which the historical technical issue negatively impacted the performance of the first computing service is greater than or equal to an extent threshold.

(C3) In the system of any of C1-C2, wherein the processing system is configured to: generate a tracking cookie that is configured to create a record of operations that are performed by a user who manages the first computing service; and analyze the tracking cookie to identify the historical mitigation workflows and to determine the relevance of each historical mitigation operation.

(C4) In the system of any of C1-C3, wherein the processing system is further configured to: identify the historical technical issue by analyzing user-generated information that specifies the historical technical issue; and wherein the historical mitigation workflows are identified based at least in part on the user-generated information further specifying the historical mitigation operations.

(C5) In the system of any of C1-C4, wherein the processing system is further configured to: determine that the second computing service is dependent on a third service; determine that the third service is modified to include an update prior to the second computing service encountering the current technical issue; and wherein the mitigation operation is configured to modify the third service by performing an action on the update based at least in part on a second confidence factor being greater than or equal to a second confidence threshold, the second confidence factor representing a confidence that the third service being modified to include the update contributed to the current technical issue.

(C6) In the system of any of C1-C5, wherein the processing system is further configured to: categorize a plurality of identified historical technical issues among a plurality of issue categories, which correspond to a plurality of respective subsets of attributes of the plurality of respective identified historical technical issues, such that each issue category of the plurality of issue categories includes at least one identified historical technical issue of the plurality of identified historical technical issues; and wherein the historical technical issue is determined to be related to the current technical issue further based at least in part on the historical technical issue being categorized into a particular issue category of the plurality of issue categories.

(C7) In the system of any of C1-C6, wherein the processing system is further configured to: determine a risk of failure of each historical mitigation operation in the historical mitigation workflows; and wherein the mitigation workflow is generated by selecting the historical mitigation operations further based at least in part on the risk of failure of each historical mitigation operation being less than or equal to a risk threshold.

(C8) In the system of any of C1-C7, wherein the processing system is further configured to: determine a likelihood that each historical mitigation operation in the historical mitigation workflows will negatively impact the second computing service; and wherein the mitigation workflow is generated by selecting the historical mitigation operations further based at least in part on the likelihood that each historical mitigation operation will negatively impact the second computing service being less than or equal to a likelihood threshold.

(C9) In the system of any of C1-C8, wherein the processing system is further configured to: determine a number of instances of each historical mitigation operation among a plurality of identified historical mitigation workflows; and wherein the number of instances of each historical mitigation operation is greater than or equal to a number threshold.

(C10) In the system of any of C1-C9, wherein the processing system is further configured to: determine a likelihood of success of each historical mitigation operation; and wherein the likelihood of success of each historical mitigation operation is greater than or equal to a likelihood threshold.

(C11) In the system of any of C1-C10, wherein the processing system is further configured to: determine an impact of each historical mitigation operation; and wherein the impact of each historical mitigation operation is greater than or equal to an impact threshold.

(D1) A first example method, which is implemented by a computing system (FIG. 1, 102A-102M, 106A-106N; FIG. 4, 400; FIG. 8, 800), comprises determining (FIG. 2, 202) that historical technical issues that were encountered by one or more computing services are related to a current technical issue that is encountered by a computing service based at least in part on confidence factors associated with the respective historical technical issues being greater than or equal to a confidence threshold. Each confidence factor represents a confidence that one or more attributes of the respective historical technical issue correspond to one or more attributes of the current technical issue. The first example method further comprises identifying (FIG. 2, 204) historical mitigation workflows that were performed to mitigate the respective historical technical issues, each historical mitigation workflow including one or more historical mitigation operations. The first example method further comprises determining (FIG. 2, 206) a relevance of each historical mitigation operation that is included among the historical mitigation workflows. The first example method further comprises generating (FIG. 2, 208) a mitigation workflow (FIG. 4, 452), which is configured to mitigate the current technical issue, by aggregating a subset of the historical mitigation operations based at least in part on each historical mitigation operation in the subset having a relevance that satisfies a relevance criterion.

(D2) In the method of D1, further comprising: determining whether the mitigation workflow is to be generated based at least in part on an extent to which the historical technical issues negatively impacted performance of the one or more computing services; wherein generating the mitigation workflow comprises: generating the mitigation workflow based at least in part on the extent to which the historical technical issues negatively impacted the performance of the one or more computing services being greater than or equal to an extent threshold.

(D3) In the method of any of D1-D2, further comprising: generating a tracking cookie that is configured to create a record of operations that are performed by a user who manages at least one of the one or more computing services; wherein identifying the historical mitigation workflows and determining the relevance of each historical mitigation operation that is included among the historical mitigation workflows are performed by analyzing the tracking cookie.

(D4) In the method of any of D1-D3, further comprising: identifying the historical technical issues by analyzing user-generated information that specifies at least one historical technical issue that is included among the historical technical issues; wherein identifying the historical mitigation workflows comprises: identifying at least one historical mitigation workflow that was performed to mitigate the at least one historical technical issue based at least in part on the user-generated information further specifying one or more historical mitigation operations that are included in the at least one historical mitigation workflow.

(D5) In the method of any of D1-D4, further comprising: determining that the computing service is dependent on a second service; and determining that the second service is modified to include an update prior to the computing service encountering the current technical issue; wherein generating the mitigation workflow is performed by aggregating a plurality of mitigation operations, including a designated mitigation operation that is configured to modify the second service by performing an action on the update and further including the subset of the historical mitigation operations, based at least in part on a second confidence factor being greater than or equal to a second confidence threshold, the second confidence factor representing a confidence that the second service being modified to include the update contributed to the current technical issue.

(D6) In the method of any of D1-D5, further comprising: categorizing a plurality of identified historical technical issues among a plurality of issue categories, which correspond to a plurality of respective subsets of attributes of the plurality of respective identified historical technical issues, such that each issue category includes at least one of the plurality of identified historical technical issues; wherein determining that the historical technical issues that were encountered by the one or more computing services are related to the current technical issue that is encountered by the computing service comprises: determining that the historical technical issues that were encountered by the one or more computing services are related to the current technical issue that is encountered by the computing service further based at least in part on the historical technical issues that were encountered by the one or more computing services being categorized into a common issue category that is included in the plurality of issue categories.

(D7) In the method of any of D1-D6, wherein generating the mitigation workflow comprises: generating the mitigation workflow by aggregating the subset of the historical mitigation operations further based at least in part on each historical mitigation operation in the subset being included in a historical mitigation workflow that mitigated the corresponding historical technical issue to an extent that is greater than or equal to an extent threshold.

(D8) In the method of any of D1-D7, wherein determining the relevance of each historical mitigation operation that is included among the historical mitigation workflows comprises: determining a number of instances of each historical mitigation operation that is included among the historical mitigation workflows; and wherein generating the mitigation workflow comprises: generating the mitigation workflow by aggregating the subset of the historical mitigation operations based at least in part on each historical mitigation operation in the subset having a number of instances among the historical mitigation workflows that is greater than or equal to a number threshold.

(D9) In the method of any of D1-D8, wherein determining the relevance of each historical mitigation operation that is included among the historical mitigation workflows comprises: determining a likelihood of success of each historical mitigation operation that is included among the historical mitigation workflows; and wherein generating the mitigation workflow comprises: generating the mitigation workflow by aggregating the subset of the historical mitigation operations based at least in part on each historical mitigation operation in the subset having a likelihood of success that is greater than or equal to a likelihood threshold.

(D10) In the method of any of D1-D9, wherein determining the relevance of each historical mitigation operation that is included among the historical mitigation workflows comprises: determining an impact of each historical mitigation operation that is included among the historical mitigation workflows; and wherein generating the mitigation workflow comprises: generating the mitigation workflow by aggregating the subset of the historical mitigation operations based at least in part on each historical mitigation operation in the subset having an impact that is greater than or equal to an impact threshold.

(D11) In the method of any of D1-D10, further comprising: causing a visual representation of the mitigation workflow to be displayed to a user, the visual representation including a plurality of selectable interface elements, each selectable interface element representing a respective historical mitigation operation that is included in the mitigation workflow; and executing each historical mitigation operation that is represented by a selectable interface element in the visual representation that is selected by the user based on the respective selectable interface element being selected by the user.

(D12) In the method of any of D1-D11, further comprising: automatically executing the mitigation workflow to mitigate the current technical issue based on the mitigation workflow being generated.

(E1) A second example method, which is implemented by a computing system (FIG. 1, 102A-102M, 106A-106N; FIG. 7, 700; FIG. 8, 800), comprises identifying (FIG. 5, 502) historical mitigation operations that were performed to address historical technical issues that were encountered by one or more computing services. The second example method further comprises mapping (FIG. 5, 504) a current technical issue that is encountered by a computing service to one or more identified technical issues, which are included among the historical technical issues, based at least in part on one or more attributes of the current technical issue corresponding to one or more attributes of each identified technical issue. The second example method further comprises generating (FIG. 5, 506) a mitigation workflow (FIG. 7, 752), which is configured to mitigate the current technical issue, to include a subset of the historical mitigation operations that was performed to address the one or more identified technical issues based at least in part on the current technical issue being mapped to the one or more identified technical issues.

(E2) In the method of E1, further comprising: determining whether the mitigation workflow is to be generated based at least in part on an extent to which the historical technical issues negatively impacted performance of the one or more computing services; wherein generating the mitigation workflow comprises: generating the mitigation workflow based at least in part on the extent to which the historical technical issues negatively impacted the performance of the one or more computing services being greater than or equal to an extent threshold.

(E3) In the method of any of E1-E2, further comprising: generating a tracking cookie that is configured to create a record of operations that are performed by a user who manages at least one of the one or more computing services; wherein identifying the historical mitigation operations is performed by analyzing the tracking cookie.

(E4) In the method of any of E1-E3, further comprising: identifying the historical technical issues by analyzing user-generated information that specifies at least one historical technical issue that is included among the historical technical issues; wherein identifying the historical mitigation operations comprises: identifying at least one historical mitigation operation that was performed to mitigate the at least one historical technical issue based at least in part on the user-generated information indicating that the at least one historical mitigation operation was performed to mitigate the at least one historical technical issue.

(E5) In the method of any of E1-E4, further comprising: determining that the computing service is dependent on a second service; and determining that the second service is modified to include an update prior to the computing service encountering the current technical issue; wherein generating the mitigation workflow comprises: generating the mitigation workflow to further include a designated mitigation operation that is configured to modify the second service by performing an action on the update, based at least in part on a confidence factor being greater than or equal to a confidence threshold, the confidence factor representing a confidence that the second service being modified to include the update contributed to the current technical issue.

(E6) In the method of any of E1-E5, further comprising: categorizing a plurality of identified historical technical issues among a plurality of issue categories, which correspond to a plurality of respective subsets of attributes of the plurality of respective identified historical technical issues, such that each issue category includes at least one of the plurality of identified historical technical issues; wherein mapping the current technical issue that is encountered by the computing service to the one or more identified technical issues comprises: mapping the current technical issue that is encountered by the computing service to the one or more identified technical issues based at least in part on the one or more identified technical issues being categorized into a common issue category that is included in the plurality of issue categories.

(E7) In the method of any of E1-E6, wherein generating the mitigation workflow comprises: generating the mitigation workflow to include the subset of the historical mitigation operations further based at least in part on each historical mitigation operation in the subset being included among historical mitigation operations that mitigated the corresponding historical technical issue to an extent that is greater than or equal to an extent threshold.

(E8) In the method of any of E1-E7, further comprising: causing a visual representation of the mitigation workflow to be displayed to a user, the visual representation including a plurality of selectable interface elements, each selectable interface element representing a respective historical mitigation operation that is included in the mitigation workflow; and executing each historical mitigation operation that is represented by a selectable interface element in the visual representation that is selected by the user based on the respective selectable interface element being selected by the user.

(E9) In the method of any of E1-E8, further comprising: automatically executing the mitigation workflow to mitigate the current technical issue based on the mitigation workflow being generated.

(F1) A third example method, which is implemented by a computing system (FIG. 1, 102A-102M, 106A-106N; FIG. 7, 700; FIG. 8, 800), comprises identifying (FIG. 5, 502) a historical mitigation operation that was performed to address a historical technical issue that was encountered by a first computing service. The second example method further comprises mapping (FIG. 5, 504) a current technical issue that is encountered by a second computing service to the historical technical issue, based at least in part on a first attribute of the current technical issue corresponding to a second attribute of the historical technical issue. The second example method further comprises generating (FIG. 5, 506) a mitigation workflow (FIG. 7, 752), which is configured to mitigate the current technical issue, to include the historical mitigation operation that was performed to address the historical technical issue based at least in part on the current technical issue being mapped to the historical technical issue.

(F2) In the method of F1, further comprising: determining an extent to which the historical technical issue negatively impacted performance of the first computing service; wherein the extent is greater than or equal to an extent threshold.

(F3) In the method of any of F1-F2, further comprising: generating a tracking cookie that is configured to create a record of operations that are performed by a user who manages the first computing service; wherein identifying the historical mitigation operation includes analyzing the tracking cookie.

(F4) In the method of any of F1-F3, further comprising: identifying the historical technical issue by analyzing user-generated information; wherein identifying the historical mitigation operation mitigation operation is based at least in part on the user-generated information indicating that the historical mitigation operation was performed to mitigate the historical technical issue.

(F5) In the method of any of F1-F4, further comprising: determining that the second computing service is dependent on a third service; and determining that the third service was modified to include an update prior to the second computing service encountering the current technical issue; wherein generating the mitigation workflow comprises: including a designated mitigation operation that is configured to modify the third service by performing an action on the update, based at least in part on a confidence factor being greater than or equal to a confidence threshold, the confidence factor representing a confidence that the third service being modified to include the update contributed to the current technical issue.

(F6) In the method of any of F1-F5, further comprising: categorizing a plurality of identified historical technical issues among a plurality of issue categories, which correspond to a plurality of respective subsets of attributes of the plurality of respective identified historical technical issues, such that each issue category of the plurality of issue categories includes at least one identified historical technical issue of the plurality of identified historical technical issues; wherein mapping the current technical issue to the historical technical issue is based at least in part on the historical technical issue being categorized into a particular issue category of the plurality of issue categories.

(F7) In the method of any of F1-F6, further comprising: determining a risk of failure of the historical mitigation operation; wherein generating the mitigation workflow comprises: including the historical mitigation operation in the mitigation workflow further based at least in part on the risk of failure of the historical mitigation operation being less than or equal to a risk threshold.

(F8) In the method of any of F1-F7, further comprising: determining a likelihood that the historical mitigation operation will negatively impact the second computing service; wherein generating the mitigation workflow comprises: including the historical mitigation operation in the mitigation workflow further based at least in part on the likelihood that the historical mitigation operation will negatively impact the second computing service being less than or equal to a likelihood threshold.

(G1) A first example computer program product (FIG. 8, 818, 822) comprising a computer-readable storage medium having instructions recorded thereon for enabling a processor-based system (FIG. 1, 102A-102M, 106A-106N; FIG. 4, 400; FIG. 8, 800) to perform operations. The operations comprise determining (FIG. 2, 202) that historical technical issues that were encountered by one or more computing services are related to a current technical issue that is encountered by a computing service based at least in part on confidence factors associated with the respective historical technical issues being greater than or equal to a confidence threshold. Each confidence factor represents a confidence that one or more attributes of the respective historical technical issue correspond to one or more attributes of the current technical issue. The operations further comprise identifying (FIG. 2, 204) historical mitigation workflows that were performed to mitigate the respective historical technical issues, each historical mitigation workflow including one or more historical mitigation operations. The operations further comprise determining (FIG. 2, 206) a relevance of each historical mitigation operation that is included among the historical mitigation workflows. The operations further comprise generating (FIG. 2, 208) a mitigation workflow (FIG. 4, 452), which is configured to mitigate the current technical issue, by aggregating a subset of the historical mitigation operations based at least in part on each historical mitigation operation in the subset having a relevance that satisfies a relevance criterion.

(H1) A second example computer program product (FIG. 8, 818, 822) comprising a computer-readable storage medium having instructions recorded thereon for enabling a processor-based system (FIG. 1, 102A-102M, 106A-106N; FIG. 7, 700; FIG. 8, 800) to perform operations. The operations comprise identifying (FIG. 5, 502) historical mitigation operations that were performed to address historical technical issues that were encountered by one or more computing services. The operations further comprise mapping (FIG. 5, 504) a current technical issue that is encountered by a computing service to one or more identified technical issues, which are included among the historical technical issues, based at least in part on one or more attributes of the current technical issue corresponding to one or more attributes of each identified technical issue. The operations further comprise generating (FIG. 5, 506) a mitigation workflow (FIG. 7, 752), which is configured to mitigate the current technical issue, to include a subset of the historical mitigation operations that was performed to address the one or more identified technical issues based at least in part on the current technical issue being mapped to the one or more identified technical issues.

(I1) A third example computer program product (FIG. 8, 818, 822) comprising a computer-readable storage medium having instructions recorded thereon for enabling a processor-based system (FIG. 1, 102A-102M, 106A-106N; FIG. 4, 400; FIG. 8, 800) to perform operations. The operations comprise determining (FIG. 2, 202) that a historical technical issue that was encountered by a first computing service is related to a current technical issue that is encountered by a second computing service based at least in part on a confidence factor associated with the historical technical issue being greater than or equal to a confidence threshold. The confidence factor represents a confidence that a first attribute of the historical technical issue corresponds to a second attribute of the current technical issue. The operations further comprise identifying (FIG. 2, 204) historical mitigation workflows that were performed to mitigate the historical technical issues. Each historical mitigation workflow including a historical mitigation operation. The operations further comprise determining (FIG. 2, 206) a relevance of each historical mitigation operation in the historical mitigation workflows. The operations further comprise generating (FIG. 2, 208) a mitigation workflow (FIG. 4, 452), which is configured to mitigate the current technical issue, by selecting the historical mitigation operations based at least in part on each historical mitigation operation having a relevance that satisfies a relevance criterion.

III. Example Computer System

FIG. 8 depicts an example computer 800 in which embodiments may be implemented. Any one or more of the user devices 102A-102M and/or any one or more of the servers 106A-106N shown in FIG. 1, the computing system 400 shown in FIG. 4, and/or the computing system 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the history-based generation logic 108, the history-based generation logic 408, the store 410, the relation logic 412, the workflow identification logic 414, the relevance logic 416, the selection logic 418, the determination logic 420, the operation generation logic 422, the cookie logic 424, the categorization logic 426, the visual representation logic 428, the workflow execution logic 430, the history-based generation logic 708, the store 710, the identification logic 762, the mapping logic 764, the generation logic 718, the determination logic 720, the operation generation logic 722, the cookie logic 724, the categorization logic 726, the visual representation logic 728, the operation execution logic 730, flowchart 200 (including any step of flowchart 200), flowchart 300 (including any step of flowchart 300), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present disclosure. However, the scope of the present disclosure is not limited to these embodiments, but is instead defined by the appended claims. Thus, embodiments beyond those shown in the accompanying drawings, such as modified versions of the illustrated embodiments, may nevertheless be encompassed by the present disclosure.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", and "third" are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a memory; and
a processing system coupled to the memory, the processing system configured to:
determine that a historical technical issue that was encountered by a first computing service is related to a current technical issue that is encountered by a second computing service based at least in part on a confidence factor associated with the historical technical issue being greater than or equal to a confidence threshold, using a machine learning model by providing historical information that indicates at least a first attribute of the historical technical issue and current information that indicates at least a second attribute of the current technical issue as inputs to the machine learning model, the confidence factor representing a confidence that the first attribute of the historical technical issue corresponds to the second attribute of the current technical issue;
generate a tracking cookie that is configured to create a record of operations that are performed by a user who manages the first computing service;
identify historical mitigation workflows that were performed to mitigate the historical technical issue by analyzing the tracking cookie, the historical mitigation workflows including historical mitigation operations;
determine extents to which the historical mitigation operations in the historical mitigation workflows mitigated the historical technical issue; and
generate an instruction, which causes the machine learning model to generate a mitigation workflow that is configured to mitigate the current technical issue by selecting identified historical mitigation operations from the historical mitigation operations based at least on the extents to which the identified historical mitigation operations mitigated the historical technical issue satisfying a criterion.

2. The system of claim 1, wherein the processing system is further configured to:
determine an extent to which the historical technical issue negatively impacted performance of the first computing service; and
wherein the extent to which the historical technical issue negatively impacted the performance of the first computing service is greater than or equal to an extent threshold.

3. The system of claim 1, wherein the processing system is configured to:
determine the extents to which the historical mitigation operations in the historical mitigation workflows mitigated the historical technical issue by analyzing the tracking cookie.

4. The system of claim 1, wherein the processing system is further configured to:
identify the historical technical issue by analyzing user-generated information that specifies the historical technical issue; and
wherein the historical mitigation workflows are identified based at least in part on the user-generated information further specifying the historical mitigation operations.

5. The system of claim 1, wherein the processing system is further configured to:
determine that the second computing service is dependent on a third service;
determine that the third service is modified to include an update prior to the second computing service encountering the current technical issue; and
wherein the mitigation operation is configured to modify the third service by performing an action on the update based at least in part on a second confidence factor being greater than or equal to a second confidence threshold, the second confidence factor representing a confidence that the third service being modified to include the update contributed to the current technical issue.

6. The system of claim 1, wherein the processing system is further configured to:
categorize a plurality of identified historical technical issues among a plurality of issue categories, which correspond to a plurality of respective subsets of attributes of the plurality of respective identified historical technical issues, such that each issue category of the plurality of issue categories includes at least one identified historical technical issue of the plurality of identified historical technical issues; and
wherein the historical technical issue is determined to be related to the current technical issue further based at least in part on the historical technical issue being categorized into a particular issue category of the plurality of issue categories.

7. The system of claim 1, wherein the processing system is further configured to:
determine a risk of failure of each historical mitigation operation in the historical mitigation workflows; and
wherein the mitigation workflow is generated by selecting the identified historical mitigation operations further based at least in part on the risk of failure of each historical mitigation operation being less than or equal to a risk threshold.

8. The system of claim 1, wherein the processing system is further configured to:
determine a likelihood that each historical mitigation operation in the historical mitigation workflows will negatively impact the second computing service; and
wherein the mitigation workflow is generated by selecting the identified historical mitigation operations further based at least in part on the likelihood that each identified historical mitigation operation will negatively impact the second computing service being less than or equal to a likelihood threshold.

9. The system of claim 1, wherein the processing system is further configured to:
determine a number of instances of each historical mitigation operation among a plurality of identified historical mitigation workflows; and
wherein the number of instances of each identified historical mitigation operation is greater than or equal to a number threshold.

10. The system of claim 1, wherein the processing system is further configured to:
determine a likelihood of success of each historical mitigation operation; and
wherein the likelihood of success of each identified historical mitigation operation is greater than or equal to a likelihood threshold.

11. The system of claim 1, wherein the processing system is further configured to:
determine an impact of each historical mitigation operation; and
wherein the impact of each identified historical mitigation operation is greater than or equal to an impact threshold.

12. A method implemented by a computing system, the method comprising:
generating a tracking cookie that is configured to create a record of operations that are performed by a user who manages a first computing service;
identifying historical mitigation operations that were performed to address a historical technical issue that was encountered by the first computing service by analyzing the tracking cookie;
mapping a current technical issue that is encountered by a second computing service to the historical technical issue, based at least in part on a first attribute of the current technical issue corresponding to a second attribute of the historical technical issue, using a machine learning model by providing current information that indicates at least the first attribute of the current technical issue and historical information that indicates at least the second attribute of the historical technical issue as inputs to the machine learning model;

determining extents to which the historical mitigation operations mitigated the historical technical issue; and generating a mitigation workflow, which is configured to mitigate the current technical issue, using the machine learning model by causing the mitigation workflow to include identified historical mitigation operations, which are selected from the historical mitigation operations that were performed to address the historical technical issue based at least on the extents to which the identified historical mitigation operations mitigated the historical technical issue satisfying a criterion.

13. The method of claim 12, further comprising:

determining an extent to which the historical technical issue negatively impacted performance of the first computing service;

wherein the extent to which the historical technical issue negatively impacted the performance of the first computing service is greater than or equal to an extent threshold.

14. The method of claim 12, further comprising:

identifying the historical technical issue by analyzing user-generated information;

wherein identifying the historical mitigation operations is based at least in part on the user-generated information indicating that the historical mitigation operations were performed to mitigate the historical technical issue.

15. The method of claim 12, further comprising:

determining that the second computing service is dependent on a third service; and determining that the third service was modified to include an update prior to the second computing service encountering the current technical issue;

wherein generating the mitigation workflow comprises:
including a designated mitigation operation that is configured to modify the third service by performing an action on the update, based at least in part on a confidence factor being greater than or equal to a confidence threshold, the confidence factor representing a confidence that the third service being modified to include the update contributed to the current technical issue.

16. The method of claim 12, further comprising:

categorizing a plurality of identified historical technical issues among a plurality of issue categories, which correspond to a plurality of respective subsets of attributes of the plurality of respective identified historical technical issues, such that each issue category of the plurality of issue categories includes at least one identified historical technical issue of the plurality of identified historical technical issues;

wherein mapping the current technical issue to the historical technical issue is based at least in part on the historical technical issue being categorized into a particular issue category of the plurality of issue categories.

17. The method of claim 12, further comprising:

determining a risk of failure of each historical mitigation operation;

wherein generating the mitigation workflow comprises:
including the identified historical mitigation operations in the mitigation workflow further based at least in part on the risk of failure of each of the identified historical mitigation operations being less than or equal to a risk threshold.

18. The method of claim 12, further comprising:

determining likelihoods that the historical mitigation operations will negatively impact the second computing service;

wherein generating the mitigation workflow comprises:
including the identified historical mitigation operations in the mitigation workflow further based at least in part on the likelihoods that the identified historical mitigation operations will negatively impact the second computing service being less than or equal to a likelihood threshold.

19. A computer program product comprising a computer-readable storage medium having instructions recorded thereon for enabling a processor-based system to perform operations, the operations comprising:

determining that a historical technical issue that was encountered by a first computing service is related to a current technical issue that is encountered by a second computing service based at least in part on a confidence factor associated with the historical technical issue being greater than or equal to a confidence threshold, using a machine learning model by providing historical information that indicates at least a first attribute of the historical technical issue and current information that indicates at least a second attribute of the current technical issue as inputs to the machine learning model, the confidence factor representing a confidence that the first attribute of the historical technical issue corresponds to the second attribute of the current technical issue;

generating a tracking cookie that is configured to create a record of operations that are performed by a user who manages the first computing service;

identifying historical mitigation workflows that were performed to mitigate the historical technical issues by analyzing the tracking cookie, the historical mitigation workflows including historical mitigation operations;

determining extents to which the historical mitigation operations in the historical mitigation workflows mitigated the historical technical issue; and generating an instruction, which causes the machine learning model to generate a mitigation workflow that is configured to mitigate the current technical issue by selecting identified historical mitigation operations from the historical mitigation operations based at least on the extents to which the identified historical mitigation operations mitigated the historical technical issue satisfying a criterion.

20. The computer program product of claim 19, wherein the operations comprise:

determining the extents to which the historical mitigation operations in the historical mitigation workflows mitigated the historical technical issue by analyzing the tracking cookie.

* * * * *